United States Patent [19]

Fouche et al.

[11] Patent Number: 5,271,043
[45] Date of Patent: Dec. 14, 1993

[54] DEVICE AND METHOD FOR THE DATA TRANSMISSION OR STORAGE OPTIMIZING THE USE OF THE PASS-BAND

[75] Inventors: Yvon Fouche, Chatenay Malabry; Guy Desodt, Massy; Philippe Elleaume, Antony; Gérard Auvray, Longport Sur Orge; Jean Anastassiades, Verrieres Le Buisson, all of France

[73] Assignee: Thomson-CSF, Paris, France

[21] Appl. No.: 790,645

[22] Filed: Nov. 8, 1991

Related U.S. Application Data

[63] Continuation of Ser. No. 214,724, May 24, 1988, abandoned.

[51] Int. Cl.$^5$ ............................................. H04L 7/00
[52] U.S. Cl. ........................................ 375/115; 380/15; 455/102
[58] Field of Search ............... 375/115, 4, 96, 38, 375/22, 23; 370/107; 390/825.03, 825.64; 332/120, 145; 380/15; 358/120; 455/102

[56] References Cited

U.S. PATENT DOCUMENTS 3,564,412  2/1971  Whang et al. ...................... 375/42
4,171,513  10/1979  Otey et al. ...................... 375/115 X
4,280,222  7/1981  Flower ............................ 375/38

Primary Examiner—Curtis Kuntz
Assistant Examiner—Tesfaldet Bocure
Attorney, Agent, or Firm—Roland Plottel

[57] ABSTRACT

A device and a method for the transmission or storage of data optimizing the use of the pass-band. Also, a method for transmission by phase modulation. In order to obtain high data throughput rates, the synchronization of a transmission clock with the reception clocks is used. This synchronization is gotten, for example, by transmission of a pseudo-random code and by the convolution or correlation of the received signals with the pseudo-random code. The invention also enables the elimination of multiple echoes by computation. The invention can be applied chiefly to the transmission of radio programs, television broadcasts or digital data.

34 Claims, 13 Drawing Sheets

DEVICE AND METHOD FOR THE DATA TRANSMISSION OR STORAGE OPTIMIZING THE USE OF THE PASS-BAND

This application is a continuation of application Ser. No. 07/214,724, filed May 24, 1988.

BACKGROUND OF THE INVENTION

1. Field of the Invention

The main object of the present invention is a device and method for the transmission or storage of data, optimizing the use of the pass-band.

2. Description of the Prior Art

Efforts have been under way for many years to enable transmission of increasingly large quantities of data.

For example, for data transmission by ratio, the use of amplitude modulation and frequency modulation is leading to the use of increasingly higher carrier frequencies. Now the transmission of data in phase modulation would enable a substantial increase in throughput. However, this type of transmission comes up against two problems which, in prior art devices, limit performance to below that of devices using amplitude modulation or frequency modulation.

Firstly, to be able, at reception, to decode data encoded in phase modulation, it is essential to have a stable phase reference. Thus, it is indispensable to obtain perfect synchronization of clocks at transmission and at reception. The throughput rates of the data that can be transmitted depends on the stability of the clocks as well as on the precision of the phase comparators.

Secondly, the performance of devices for data transmission in phase modulation are limited by multiple echos. For, when using coherent waves, there is a risk that the multiple echos will interfere with the direct signal and disturb reception.

The device of the present invention enables the increase of the signal/noise ratio through the use of codes, for example, pseudo-random codes in phase modulation, this increase in the signal/noise ratio being got by pulse compression, and/or also enables the obtaining of the synchronization of the transmission and reception of clocks. Advantageously, at reception, the periodic synchronization of the clock is got by convolution and/or correlation of the received signal with a pseudo-random code. The synchronization is improved by using codes of great length.

In an alternative embodiment of the device according to the invention, regular codes such as, for example, 0, $\pi$, 0, $\pi$, 0, $\pi$, 0, $\pi$, ... are used for the convolution.

The use of a pseudo-random code when synchronizing the reception clock ensures the confidentiality of transmissions. It is thus possible to make transmissions which can be received only by a receiver fitted with the appropriate pseudo-random code generator. Thus, it is possible, in particular, to make subscriber television broadcasts.

The multiple echos are advantageously removed by computation. Furthermore, the performance of the device according to the present invention is further increased by using a modulation by measurements of the time elapsed before a transition, for example, within periods of fixed duration.

The present invention is not limited to data transmission. It also pertains to the storage of data on a magnetic medium for example. The use of phase modulation or modulation where measurements are made of the time elapsed before a transition within periods of fixed duration makes it possible to increase storage density and obtain one and the same type of modulation throughout the transmission-reception-recording chain.

SUMMARY OF THE INVENTION

The main object of the invention is a method for data transmission using a transmitter and a receiver, said transmitter and said receiver comprising a clock, characterized in that said method comprises the following steps:

transmission of code by transmitter;

convolution and/or correlation at reception of received signal with said code;

synchronization of reception clock with a spike obtained by the convolution and/or correlation of the received signal with said code.

Another object of the invention is a transmission method characterized in that, at reception, the value of the signal at instants determined by the clock depends on the transmitted data.

Yet another object of the invention is a transmission method characterized in that the said value of the signal is a phase.

Yet another object of the invention is a transmission method characterized in that the code used for the synchronization of the transmission clock with the reception clock is a pseudo-random code.

Yet another object of the invention is a transmission method characterized in that said method is a television broadcast transmission method.

Yet another object of the invention is a method characterized in that said method enables the transmission of data needed for the formation of a television image of average resolution as well as complementary data capable, after processing, of improving the quality of the image.

Yet another object of the invention is a method characterized in that said method is an alphanumeric data transmission method.

Yet another object of the invention is a method characterized in that said method is a radio sound broadcasting method.

Yet another object of the invention is a data recording method characterized in that a code is recorded, said code being capable, when read, of enabling the synchronization of a clock with a recording clock by convolution and/or correlation.

Yet another object of the invention is a recording method characterized in that the value of the signal, at instants determined by the reading clock, depends on the recorded data.

Yet another object of the invention is a recording method characterized in that said recording method is a magnetic recording method.

Yet another object of the invention is a modulation of an electrical signal characterized in that said signal comprises first transitions that occur at instants that are evenly distributed in time and second transitions, the instant at which the second transitions occur being a function of the information to be transmitted.

Yet another object of the invention is a modulation characterized in that an amplitude modulation is superimposed on said modulation without the reception of the transitions being prevented by the attention caused by said amplitude modulation.

Yet another object of the invention is a modulated electromagnetic radiation transmitter comprising an antenna, a source of signals to be transmitted, characterized in that it comprises a code generating device and a signal encoding device.

Yet another object of the invention is a transmitter characterized in that it comprises a control center enabling the modification and/or distribution of the data to be transmitted among several transmission channels.

Yet another object of the invention is a transmitter characterized in that said transmitter is a transmitter of television broadcasts.

Yet another object of the invention is a transmitter characterized in that said transmitter is a transmitter of radio broadcasts.

Yet another object of the invention is a data transmission device comprising a set of transmitters including an antenna, an amplifier and a receiver set comprising an antenna and an amplifier, characterized by the fact that the transmission set comprises a code generating device and a device for encoding the signal to be transmitted; the reception device comprising a code generator and devices to correlate and/or convolute the received signal with the code generated by said code generator.

An object of the invention is an electromagnetic wave receiver comprising an antenna and an amplifier characterized in that it comprises a code generator and devices which can make the correlation and/or convolution of the received signal with the code generated by the said code generator.

An object of the invention is a receiver characterized by the fact that said receiver is a television broadcasts receiver.

Another object of the invention is a receiver characterized in that it comprises a random-access video memory and an address processor which can replace data in the random-access video memory by new transmitted data.

Yet another object of the invention is a receiver characterized in that it comprises a computer and a random-access video memory which can store at least one image, said computer being capable of modifying all or a part of the image stored in the random-access video memory on the basis of the data received.

Yet another object of the invention is a receiver characterized in that it comprises a device which can be used, by computation, to eliminate multiple echos by subtracting them from the signal or by delaying them so as to put them in modulo $2\pi$ phase with the direct signal.

Yet another object of the invention is a receiver characterized in that it can eliminate multiple echos by resolving the system:

$$-Y_n = a_0 S_0 + a_1 S_1 + a_2 S_2 + \ldots + a_n S_n$$
$$-Y_{n+1} = a_0 S_1 + a_1 S_2 + a_2 S_3 + \ldots + a_n S_{n+1}$$
$$-Y_{n+2} = a_0 S_2 + a_1 S_3 + a_2 S_4 + \ldots + a_n S_{n+2}$$
$$-Y_{n+3} = a_0 S_3 + a_1 S_4 + a_2 S_5 + \ldots + a_n S_{n+3}$$
$$-Y_{n+i} = a_0 S_i + a_1 S_{i+1} + a_2 S_{i+1} + \ldots + a_n S_{n+1}$$
$$-Y_{n+p} = a_0 S_p + a_1 S_{p+1} + \ldots + a_n S_{p+n}$$

$a_1$ represents the complex amplitude of the first reflected signal, $a_2$ that of the second reflected signal, $a_3$ that of the third reflected signal, $a_i$ that of the $i^{th}$ reflected signal, $a_n$ represents the amplitude of the direct signal, $Y_{n+i}$ being the signal received at the instant $n+1$.

Yet another object of the invention is a receiver characterized in that the device can perform the convolution of the received signal by a code comprises a charge transfer device, certain cells of which, corresponding to the binary code used, are connected to an output.

Yet another object of the invention is a receiver characterized in that it comprises a frequency reduction device.

Yet another object of the invention is a control center characterized in that it can distribute data to be transmitted among several transmission channels.

Yet another object of the invention is a control center characterized in that the said control center is digital.

BRIEF DESCRIPTION OF THE DRAWINGS

The invention will be better understood from the following description and the appended figures, given as non-restrictive examples, of which:

In FIGS. 1 to 21, the same references have been repeated for the same elements.

DESCRIPTION OF THE PREFERRED EMBODIMENT

Figure 1:
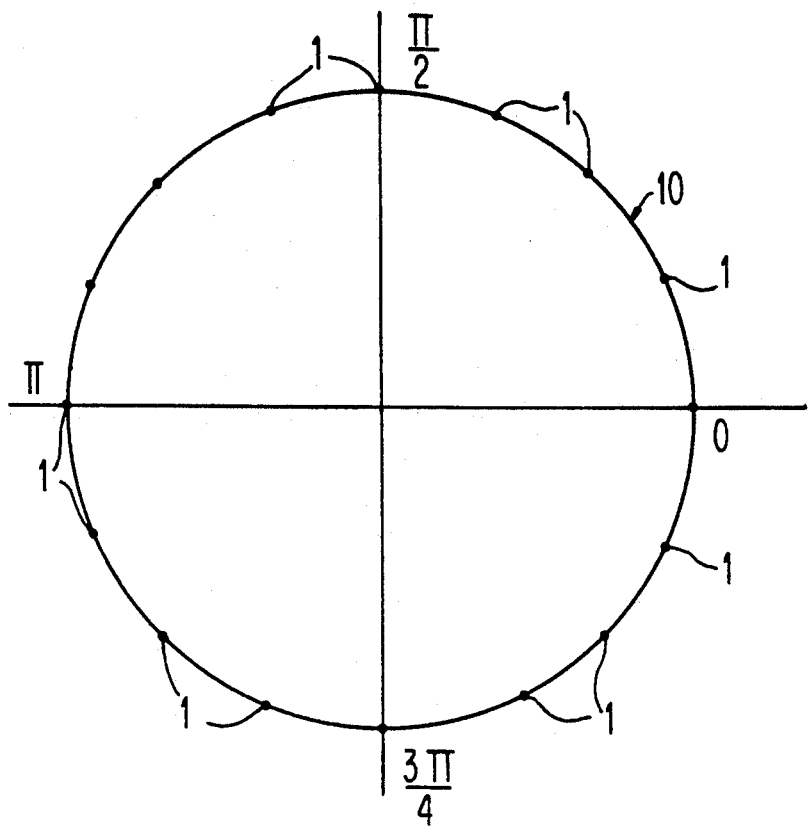
FIG. 1 is a schematic drawing illustrating the principle of the phase modulation.

FIG. 1 shows a schematic drawing illustrating the principle of the phase modulation. The circle 10 is a trigonometrical circle. In digital transmission by phase modulation, the value of the phase can assume a finite number of discrete values ranging between 0 and $2\pi$. These discrete values are represented by dots 1 on the trigonometrical circle 10. The number of dots 1 on a trigonometrical circle 10 depends on the precision with which the transmission and reception clocks are synchronized and on the S/N ratio at reception. The greater the quality of synchronization, the more it will be possible to distinguish distinct dots 1, and consequently, the greater will be the throughput rate of data transmitted. In the example shown in FIG. 1, only sixteen dots 1 have been depicted. It is understood that a far greater number of dots 1 can be used. For example, with current technologies, it is possible to distinguish points 1 at an angular distance of 0.1° between one another. Advantageously, the points 1 can be distributed evenly on the trigonometrical circle 10.

The phase may take any one of the values belonging to the interval $0.2\pi$ in the case of analog transmissions by phase modulation.

The phase modulation enables working in constant amplitude. Advantageously, the transmission amplifiers working in saturated mode, for example in class C, make it possible to optimize the efficiency of the transmitters.

Figure 2:
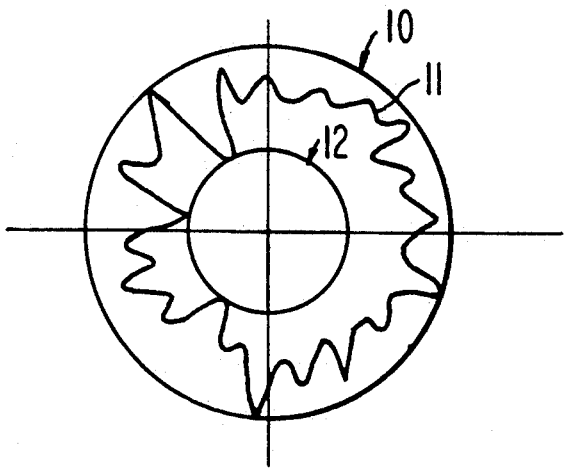
FIG. 2 is a schematic drawing illustrating the principle of the phase modulation and the amplitdue modulation.

FIG. 2 shows a diagram illustrating simultaneous phase and amplitude modulation. The diagram of FIG. 2 illustrates the possible form assumed by the phase and amplitude of the transmitted signal 11.

In order not to lose the phase data, the amplitude of the signal should be included between two circles 10 and 12, the circle 10 corresponding to the maximum amplitude that can be transmitted and the circle 12, at minimum amplitude, enabling a phase measurement.

Figure 3:
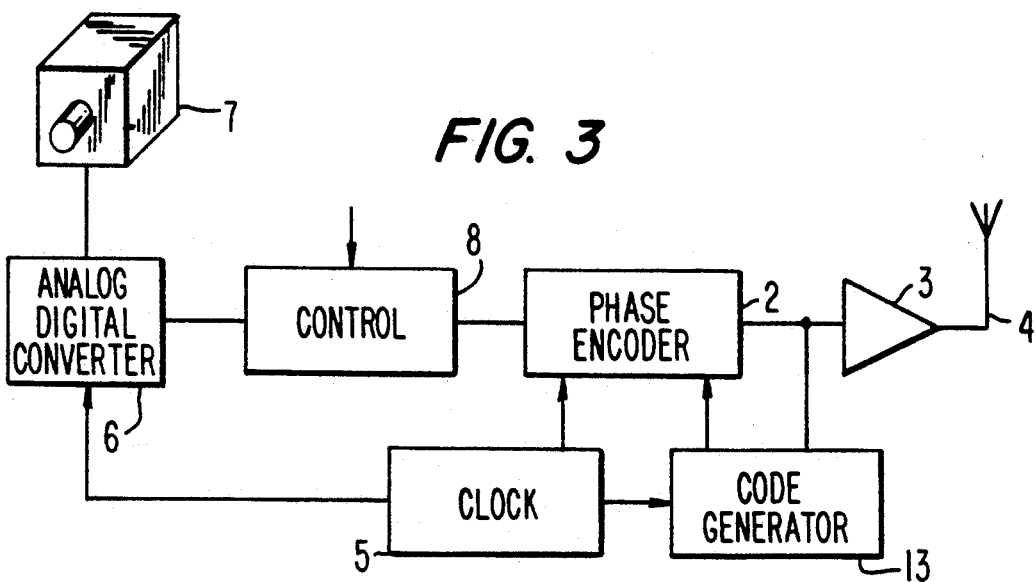
FIG. 3 is a diagram of a first embodiment of a television transmission device according to the invention.

FIG. 3 shows a device which can be used to make television transmissions. The device comprises the following connected in series: a video signal source, for example a television camera 7, an analog/digital converter 6, a phase-encoding device 2, an amplifier 3 and a transmission antenna 4. A high-precision clock 5 is connected to the analog/digital converter 6, the phase-encoding device 2 and a pseudo-random code generator code 13. The pseudo-random code generating device 13 is connected to the phase-encoding device 2 and/or to the input of the amplifier 3.

Advantageously, a control center 8 is used to choose, mix or modify the images which are to be transmitted. The control center 8 can be used to exploit the possibilities of the device according to the present invention, especially the fact that it is possible to separate the physical channel for the transmission of the transmitted data. Thus it is possible, for example, to transmit television images, sound, alphanumerical data as well as machine-controlling signals on one and the same channel. The control center 8 can be used to process, mix and distribute the data to be transmitted among several channels. In the example shown in FIG. 3, the control center 8 is a digital control center. It is therefore placed between the output of the analog/digital converter 6 and the input of the phase-encoding device 2. The control center 8 has inputs enabling it to receive video images from other sources such as, for example, other television cameras or video tape-recorders (not shown).

Advantageously, the control center 8 is used to form several channels transmitted simultaneously on several carrier waves and/or in temporal multiplexing mode. Thus, it is possible not to limit the transmissions to television images and to also transmit, for example, digitized data or sound.

In one alternative embodiment using an analog control center 8, the control center is between the camera 7 and the input of the analog/digital converter 6.

The television camera 7 is used to obtain a video image. The video image is digitized by the analog/digital converter 6 synchronized by the clock 5. The control center 8 is used to make those modifications, deemed to be necessary, of the digitized image. The phase-encoding device 2 converts the digital value of the image into a value of the phase of the signal. For example, if the video signal has been digitized on four bits (corresponding to 16 levels), the value "4" will correspond to a phase delay of $\pi/2$. The value of four bits has been chosen as a non-exhaustive example and it is understood that digitizations of the video signal comprising a far greater number of bits does not go beyond the scope of the present invention. The number of distinct phase levels is limited by the precision of the clocks, especially that of the transmission clock, that of the phase detectors and that of the synchronization as well as by the signal-to-noise ratio. However, it must be recalled that the possibility of synchronizing the clocks by remote control, by radio, are limited by the frequency of the carrier waves used and by the theory of relativity.

For the proper functioning of the system, it is essential to have the ability to recreate a phase reference at reception. As we shall see further below, a clock is used for this purpose. However, it is essential synchronize the transmission and reception clocks periodically. The frequency of these synchronizations of the transmission and reception clocks depends on the precision and stability of these clocks. The transmission clock 5 is part of a highly expensive installation and will therefore advantageously be a clock with high long-term precision, for example, an atomic clock. Depending on the desired precision, the clock 5 will be, for example, a rudibium clock or a caesium clock or a caesium beam clock cesium clock. The choice of the clock used depends, in particular, on the distances over which transmission may be made.

It is advantageous to use a quartz oscillator with high short-term stability, automatically linked to an atomic clock with high long-term stability.

The automatic linking of a quartz clock may cause instability created by the dissipation of the energy given to the oscillator to force it to take a desired value. To be rid of the effects of the said instabilities, an alternative embodiment has two quartz oscillators synchronized alternately with the atomic clock. One quartz oscillator is synchronized with the atomic clock simultaneously and, until its own synchronization, while the other quartz oscillator is used as a reference for the transmission.

The use of two alternately and automatically linked quartz oscillators is not limited to the transmitter. In the receiver, it is advantageous to use two quartz oscillators automatically linked alternately to the clock of the transmitter.

Advantageously, the transmission clock 5 and a reception clock are synchronized by convolution and/or correlation of the signal received with a code, for example, a pseudo-random code. To obtain the clock synchronization in this way, a code must be transmitted.

In a first alternative embodiment, a pseudo-random code generator 13 transmits a code permanently. The pseudo-random code generator 13 is connected to the phase-encoding device 2. The pseudo-random code generated by the generator 13 is permanently superimposed on the phase encoding of the image. For example, the phase encoded image is modulated by the pseudo-random code.

This modulation may have a low amplitude. At reception, the correlation of the pseudo-random code generated by a generator 13, with the same code, enables the extraction of the clock synchronizing signals. The lower the phase-encoding modulation by the code generated by the pseudo-random code generator, the more it becomes necessary to use long codes. To the extent that the encoding is known and/or to the extent that it is possible to obtain synchronization signals at reception, it will be possible, in addition to the phase demodulation of the image, to perform a phase demodulation corresponding to the synchronization code. Thus the modulation due to the pseudo-random code does not substantially lower the quality of the signal/noise ratio.

Advantageously, a single pseudo-random code enables a phase encoding that increases the signal/noise ratio, synchronizes the clocks and, thus, also makes it possible to make the transmissions secret.

It is advantageous to encode data to be transmitted so as to enable a pulse compression. In addition the improvement of the signal/noise ratio, the confidential nature of the transmission is ensured because, without knowing the encoding used, it is impossible to decode the signal.

In a second alternative embodiment, the synchronization code is transmitted periodically, for example, in alternation with the data to be transmitted.

Advantageously, in the case of television programme transmission, the pseudo-random code providing for synchronization is transmitted during those time intervals which are not used to transmit the signal, for example during line returns and/or frame returns.

If the encoding device is a phase-encoding device, the transmission amplifier 3 can operate in class C where it has the highest efficiency.

Should it be desired to further increase the transmitted data throughput rate, obtain a phase encoding and an amplitude encoding, the transmitter 3 operates in a standard manner. Amplitude modulation can give data complementary to the data transmitted by phase modulation. For example, the phase modulation transmits a video image and the amplitude modulation transmits complementary information used to obtain a high resolution video image.

Advantageously, the phase encoding done by the device is chosen in such a way that the signal/noise ratio is at its maximum.

Figure 4:
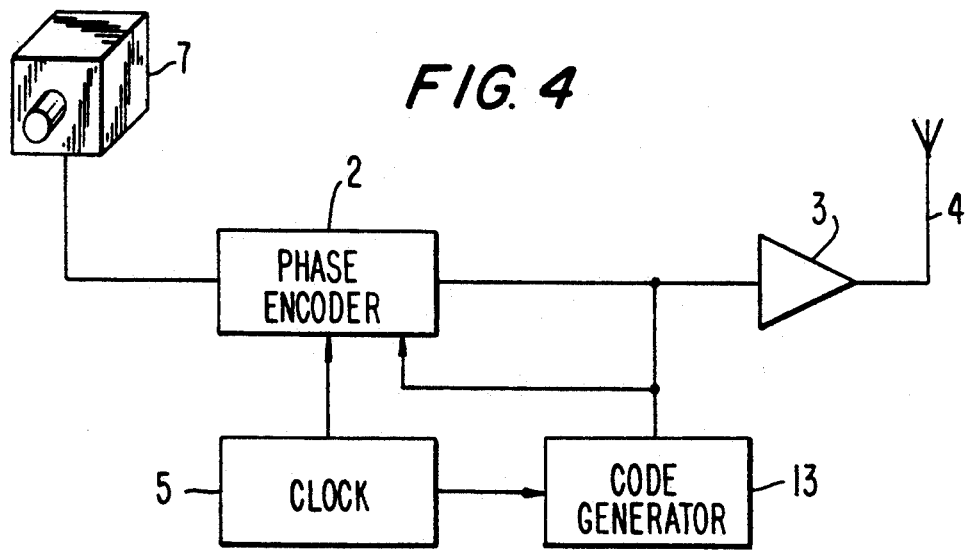
FIG. 4 is a diagram of a second embodiment of a television transmission device according to the invention.

FIG. 4 shows an analog transmission device for television broadcasts. The device has the following connected in series: a television camera 7, a phase-encoding device 2, an amplifier 3 and a transmission antenna 4. A clock 5 is connected to the phase-encoding device 2 and to a pseudo-random code generator 13. The pseudo-random code generator 13 is connected to the phase-encoding device 2 and/or to the input of the amplifier 3.

The phase-encoding device 2 performs an analog phase modulation of the video signal received, for example, from the camera 7. The amplifier 3 is advantageously a coherent amplifier. For example, the amplifier 3 is a continuous wave amplifier. Advantageously, for the phase/amplitude modulation, the transmissions are done in single sideband. Thus the transmitting power is reduced and the decoding is made easier.

Figure 5:
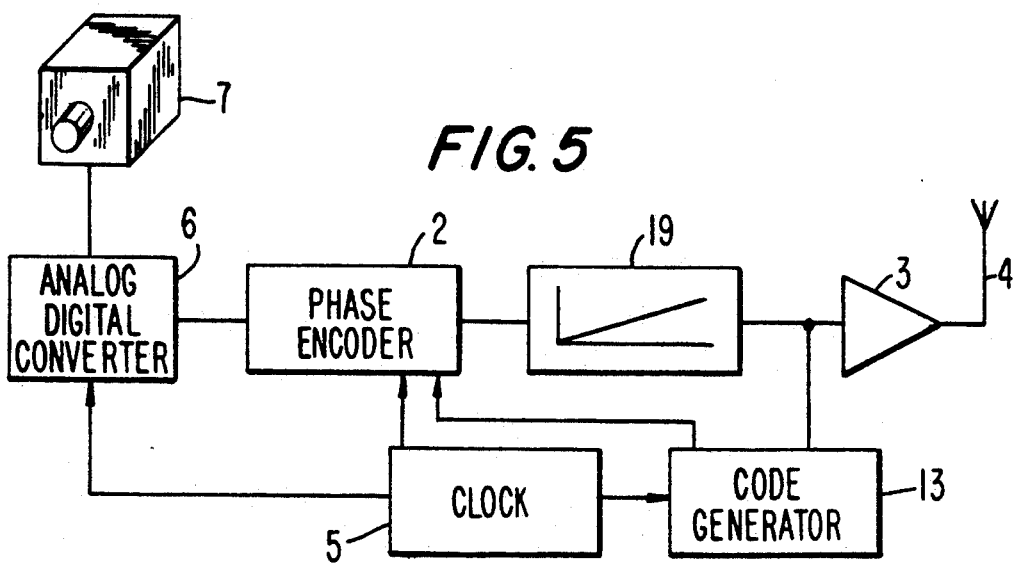
FIG. 5 is a diagram of a third embodiment of a television transmission device according to the invention.

FIG. 5 shows a television broadcast transmission device. The said device comprises the following connected in series: a television camera 7, an analog/digital converter 6, a phase-encoding device 2, a pulse compression device 19, an amplifier 3 and an antenna 4. A clock 5 is connected in parallel to the analog/digital converter 6, the phase-encoding device 2 and a pseudo-random code generator 13. The pseudo-random code generator 13 is connected either to the phase-encoding device 2 and/or to the input of the amplifier 3. The pulse compression device 19 uses a suitable phase-encoding operation known per se to increase the signal/noise ratio. For example, the device 19 performs a variation of the frequency as a function of time. For the analog versions of the device according to the invention, the device 19, is for example, a surface acoustic wave (SAW) filter.

In one alternative embodiment not shown, the phase encoding device 2 provides for pulse compression.

Figure 6:
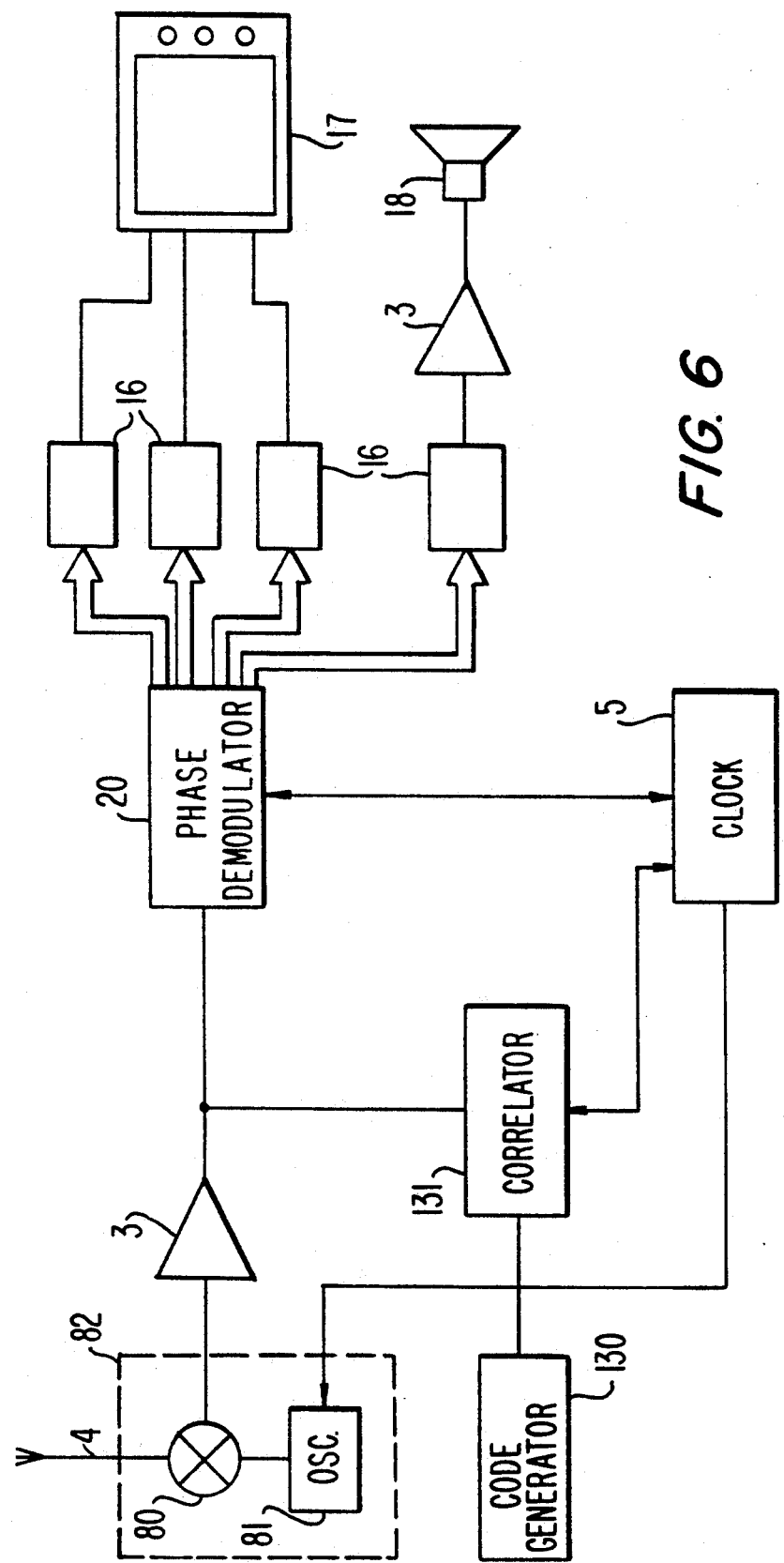
FIG. 6 is a diagram of a first embodiment of a television receiver according to the invention.

FIG. 6 shows a television receiver according to the present invention. The device of FIG. 6 comprises the following connected in series: an antenna 4, a frequency changing device 82, an intermediate frequency amplifier 3, a phase demodulation device 20, digital/analog converters 16, a cathode tube 17 or an audiophonic amplifier 3 and a loudspeaker 18. At the output of the intermediate frequency amplifier 3, is connected a correlator 131 which also receives a pseudo-random code from a pseudo-random code generator 130. The correlator 131 enables the synchronization at reception of a clock 5 with the clock 5 of FIGS. 3 to 5. The clock 5 is connected to the phase demodulation device 20. The frequency conversion device 82 comprises, for example, a local oscillator 81 supplying a duplexer 80. The frequency reduction is obtained by beating between the signal generated by the local oscillator 81 and the signal received by the antenna 4. Advantageously, the local oscillator 81 is connected to the clock 5. Advantageously, the frequency conversion device 82 delivers, at two outputs in quadrature (not shown), the signal without phase shift and the $\pi/2$ phase-shifted signal.

Initially, the correlator 131 correlates the signal received from the amplifier 3 with the code 130. This correlation enables it to synchronize the clock 5 with the sampling frequency of the signal at transmission. Then the correlator 131 shifts the code 130 with respect to the signal received from the amplifier 3 until a maximum correlation is obtained which will give the synchronization of the phase modulation. In one embodiment, the clock 5 is used to give the phase demodulation device 20 two frequencies, for example the 100 MHz frequency enabling the allocation of various values to the 10 MHz phase and frequency, corresponding to the sampling frequency of the signal. In this case, the phase can obtain 21 values. In the non-restrictive example, the 10 MHz frequency corresponds to exactly half of that laid down by the video image production standards 4.2.2. The use of an intermediate frequency amplifier 3 with a limiter simplifies the construction of the receiver.

In one alternative embodiment of the device according to the invention, the clock 5 is capable of further giving a frequency which is double the sampling frequency. Thus, it would be possible to (transmit and) receive a double data throughput. The additional data can be used either to (transmit and) receive a second television channel or to obtain a high resolution image. It must be noted that a simple change in the clock frequency makes it possible to change from normal television to a doubling of available channels or to high-resolution television. The phase demodulator makes a digital signal received in phase modulation with a digital value which will enable the driving of electron guns or audiophonic amplifiers after its conversion into analog values by digital/analog converters 16. For example, the phase modulator 20 is connected to three first digital/analog converters 16 connected to three electron guns of a color cathode ray tube 17. A fourth digital/analog converter 16 is, for example, connected to an audiophonic amplifier 3 which is itself connected to a loudspeaker 18. Thus a image is obtained with a sound corresponding to the transmitted television programme.

Figure 7:
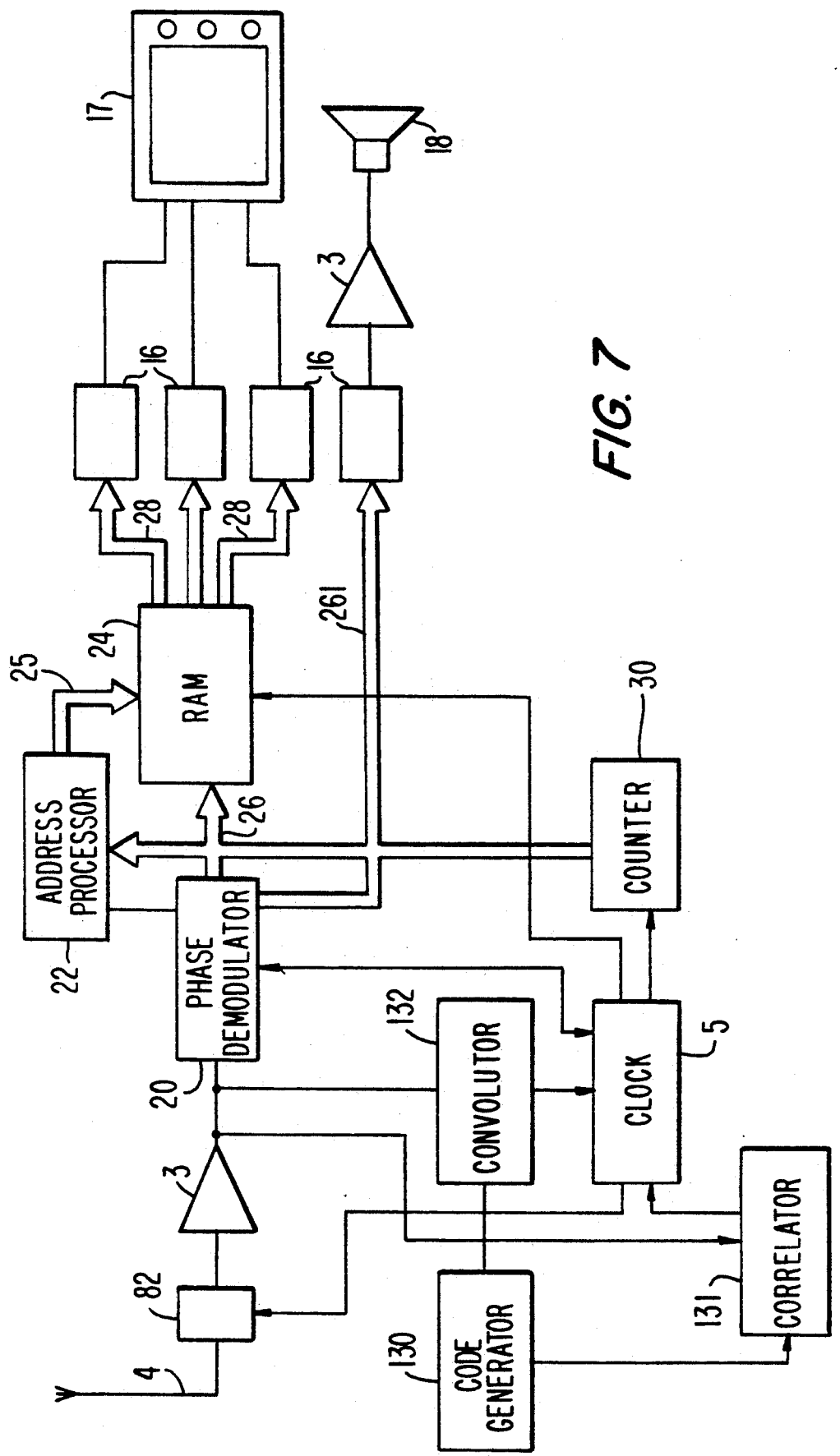
FIG. 7 is a diagram of a second embodiment of a television receiver according to the invention.

FIG. 7 shows an alternative embodiment of a television receiver according to the invention. The device of FIG. 7 comprises the following connected in series: an antenna 4, a frequency changing device 82, an intermediate frequency amplifier 3, a phase demodulation device 20, a bus 26, a video RAM 24, analog/digital converters 16 and a cathode ray color tube 17. The phase demodulation device 20 is further connected by a bus 261 to a digital/analog converter 16, an audiophonic amplifier 3 and a loudspeaker 18. To the output of the intermediate frequency amplifier 3, there are connected firstly, a correlator 131 and secondly, a convolutor 132, connected to a clock 5. A pseudo-random code generator 130 is connected to the convolutor 132 and the correlator 131. The clock 5 is connected to the phase demodulation device 20, the video memory 24 and a counter 30. The counter 30 is connected to an address processor 22 of the video memory 24. Furthermore, the phase demodulation device 20 is connected to the address processor 22. The address processor 22 is connected by an address bus 25 to the video RAM 24.

The clock 5 comprises, for example, a quartz oscillator. In the alternative embodiment that requires high precision in order to space out the transmission and reception clock synchronizations, atomic clocks are used.

Figure 8:
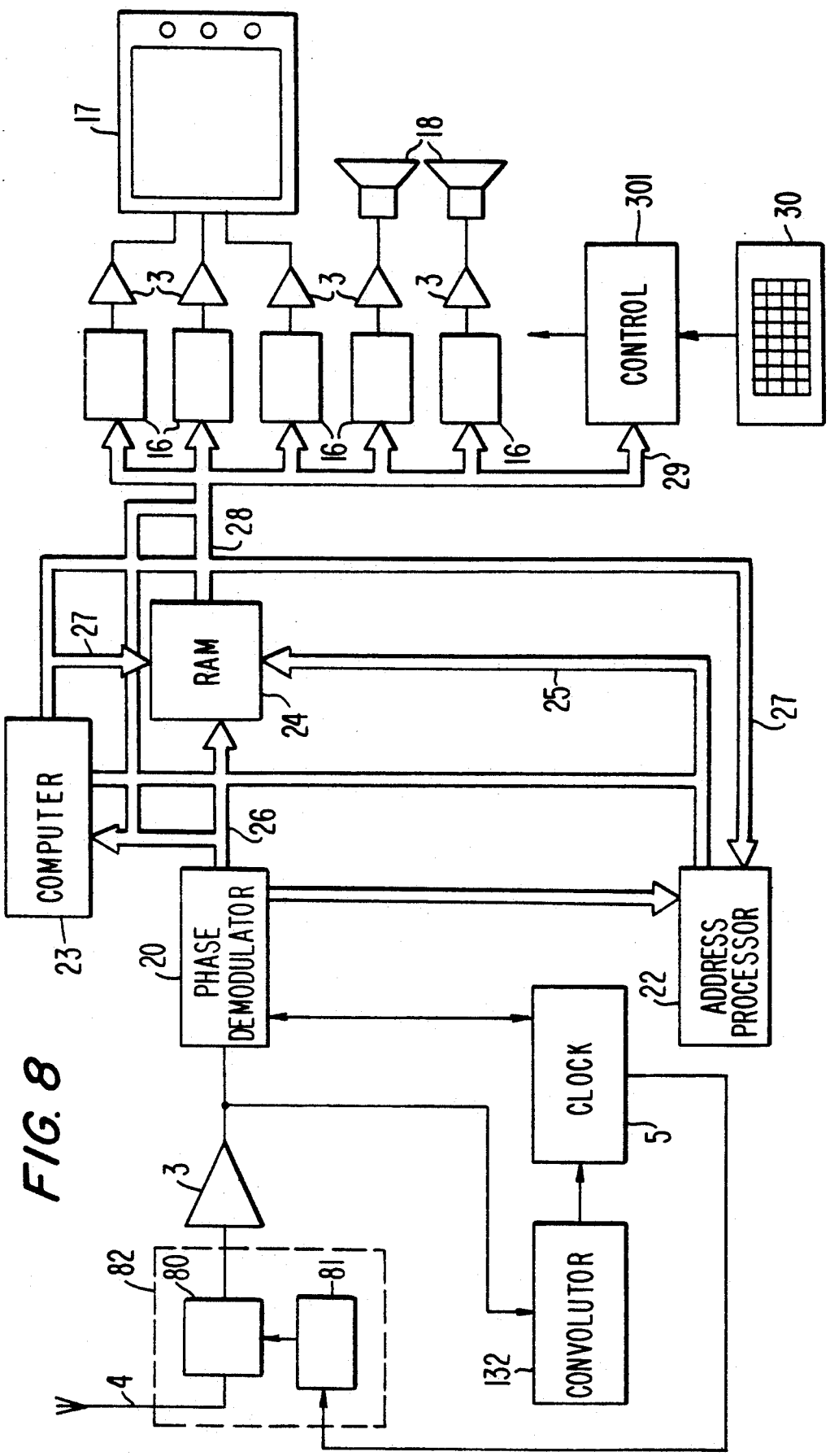
FIG. 8 is a diagram of a third embodiment of a television receiver according to the invention.

The address processor 22, associated with the counter 30, is used to generate addresses transmitted to the video memory 24 by the bus 25 enabling the phase demodulation device 20 to write modifications of an already stored image. Thus it is possible to increase the resolution of the television image. Once a video image has been stored in the memory 24, it is possible to receive mainly the data designed to modify this image as and when it changes following a movement on the screen. This data on the modification of the image may relate to points of the image or image elements comprising several points. FIG. 8 shows a particularly improved type of television image receiving device. This device can be used to receive high-resolution television images as well as to perform computations by which the influence of multiple echos can be got rid of.

The reception device comprises the following elements connected in series: an antenna 4, a frequency changing device 82, an intermediate frequency amplifier 3, a phase demodulation device 20, a video memory 24, digital/analog converters 16, amplifiers 3, a cathode ray tube 17 or loudspeakers 18. The output of the intermediate frequency amplifier 3 is connected to the convolutor 123. The convolutor 123 is connected to a clock 5. The clock 5 is connected to the phase demodulation device 20. The phase demodulation device 20 is connected by a bus to an address processor 22. The address bus 25 is used to connect a computer 23 and the address processor 22 to the video memory 24. A data bus 26 is used to connect the demodulation device 20, the computer 23 to the input or to the output of the video memory 24. The output bus 28 of the video memory 24 is connected in parallel, for example, to five digital/analog converters 16 as well as to an external digital connection 29. The first three digital/analog converters 16 are connected to three amplifiers 3 used to drive three electron guns of a cathode ray tube 17. The amplifiers 3 are used to adapt the output levels of the digital/analog converters to the optimum operating level of the tube 17. It is understood that the use of a monochrome cathode ray tube 17 is not beyond the scope of the present invention. In this case, a single digital/analog converter 16 is used to obtain the image. Two digital analog converters 16 are connected through audiophonic amplifiers 3 to loudspeakers 18. The use of two separate audiophonic channels gives stereophony or makes it possible to obtain two different texts simultaneously. This may be used, for example, to receive a television broadcast with sound in several languages simultaneously. It is understood that the use of a greater number of channels is not beyond the scope of the present invention.

The bus 29 is used to receive digital data. It can be used, in particular to make alphanumeric letters appear on the screen as sub-titles, to transmit data or programmes to microcomputers or to print required information on a printer. Furthermore, the bus 29 can be used to receive control signals enabling, for example, remote control by radio. Thus, it is possible to programme the automatic switching on of a television receiver, or a video tape-recorder at the start of a broadcast, on a control device 301, by means of a keyboard 302 for example.

The use of only the correlation to synchronize the reception clock 5 with the transmission clock simplifies the making of the device according to the invention. However, it has the disadvantage of reducing the throughput of data that can be transmitted.

The computer 23 can be used to obtain high-resolution television and/or to eliminate multiple echos. A method for transmitting high resolution television images has been described in the French patent No. 82 11209.

The antenna 4 receives not only the direct signal emitted by the transmitter but also the reflected signals. These signals have followed a path different from that followed by the direct signal. Thus they are delayed with respect to the direct signal. This delay entails a phase difference. But the reflection is not total. Thus, the reflected signal does not have the same amplitude as the direct signal. The total signal received at each instant is the superimposition of the direct signal on the reflected signal. Thus, at an instant $t_i$, a signal $Y_i$. $t_i - t_{i-1} = 1/f_e$, $f_e$ being the sampling frequency, for example, 10 MHz. At each instant $Y_n$, there is received a signal:

$$-Y_n = a_0S_0 + a_1S_1 + a_2S_2 + \ldots + a_nS_n$$
$$-Y_{n+1} = a_0S_1 + a_1S_2 + a_2S_3 + \ldots + a_nS_{n+1}$$
$$-Y_{n+2} = a_0S_2 + a_1S_3 + a_2S_4 + \ldots + a_nS_{n+2}$$
$$-Y_{n+3} = a_0S_3 + a_1S_4 + a_2S_5 + \ldots + a_nS_{n+3}$$
$$\vdots$$
$$-Y_{n+p} = a_0S_p + a_1S_{p+1} + \ldots + a_nS_{p+n}$$

$a_1$ represents the complex amplitude of the first reflected signal, $a_2$ that of the second reflected signal, $a_3$ that of the third reflected signal and so on, $a_n$ represents the amplitude of the direct signal. The signal can be standardized by assuming that $a_n = 1$. It is seen that, at reception, a system of equations is obtained wherein, at the end of a sufficiently long period of time, it is possible to obtain more equations than unknown quantities. The computers 23 remove the unknown quantities from the system. Once the coefficient of the equation system is known, the computer 23 performs corrections in the video memory 24 by contributing the necessary delay to correct the influence of the reflected signals on the received signal.

Advantageously, at transmission, the signal is interrupted by blanks so that, at reception, it becomes easy to analyze the multiple echos in order to eliminate them more effectively.

A generalization can be made for a continuous transmission signal x(t) without the sampling frequency being necessarily constant.

A signal y(t) is picked up:

$$y(t) = x(t) * h(t)$$

* being the product of convolution and h(t) being the transfer function of the space between the transmitter and the receiver.

In the absence of unwanted echoes:

$$h(t) = a_0 \delta(t - t_o)$$

being the Dirac function, $a_o$ the amplitude of the received signal and $t_o$ the arrival time at the signal receiver.

When there are multiple echos, the transfer function h(t) becomes:

$$h(t) = \Sigma_i a_i \delta(t - t_i)$$

To get rid of the effect of the unwanted echos, it is necessary to eliminate, in h(t):

$$\sum_{i \neq o} a_i \delta(t - t_i)$$

Take the Fourier transform of the equation (1):

$$Y(f) = X(f) \cdot H(f)$$

Y (f) being the Fourier transform of y(t), X(f) the Fourier transform of x(t) and H(f) the Fourier transform of h(t).

Let $\rho_{yx}(\tau)$ be the intercorrelation function of y and x:

$$\rho_{yx}(\tau) = <y|x>\tau = \int y(t) \overline{x(t+\tau)} d\tau$$

Now, at reception, the encoding x(t) used at reception is known. Let $\phi_{yx}(f)$ be the Fourier transform of $\rho_{yx}(\tau)$ $$\phi_{yx}(f) = Y(f) \cdot \overline{X(f)}$$

$$\phi_{yx}(f) = H(f) \cdot |X(f)|^2$$

$$\phi_{yx}(f) = H(f) \cdot \phi_{xx}(f)$$

Hence:

$$H(f) = \frac{\phi_{yx}(f)}{\phi_{xx}(f)}$$

let $$G(f) = \frac{1}{H(f)}$$

and g(t) the inverse Fourier transform of G(f)

$$g(t) = TF^{-1}\left(\frac{1}{TF(h(t))}\right)$$

g(t) is the the transfer function of a filter which eliminates the multiple echos.

Advantageously, the filter for which the transfer function is g(t) is a programmable digital filter.

Figure 9:
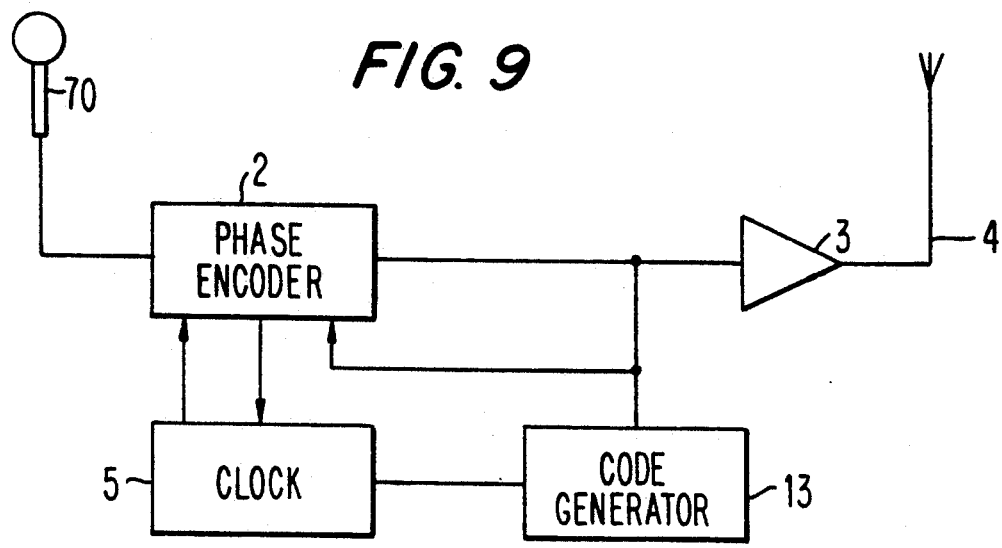
FIG. 9 is a diagram of an embodiment of a radio broadcast transmitter according to the invention.

FIG. 9 shows an example of a radio transmission device according to the invention. The transmission device comprises the following elements connected in series: an audiophonic signals source 70, a phase-encoding device 2, an amplifier 3 and an antenna 4. The phase-encoding device 2 is connected to a high-precision clock 5. Furthermore, the clock 5 is connected to a pseudo-random code generating device 13. The pseudo-random code generating device 13 is connected to the input of the amplifier 3.

In one alternative embodiment, regular codes are used, such as, for example:

0, $\pi$, 0, $\pi$, 0, $\pi$, ...
or 0, $\pi/2$, 0, $\pi$, 0, $\pi/2$, 0, $\pi$, 0 ...
or 0, $\pi$, $\pi$, 0, $\pi$, $\pi$, 0, $\pi$, $\pi$, 0, $\pi$, $\pi$, ...

The sound transmissions should be continuous. There is no time available, as in television, corresponding to the line return and/or frame return during which, without lowering quality, it is possible to transmit service data, and, especially data enabling the synchronization of the transmission and reception clocks. Thus, for radio transmissions, the chosen code will be systematically superimposed on the phase encoding of the audiophonic signal. The code (for example pseudo-random code) generating device 13 enables the phase-encoding device to modulate the phase-modulated audiophonic signal according to the said code. The audiophonic signal source 70 is, for example, a microphone, a video tape-recorder or a control center.

Advantageously, for example, several independent audiophonic channels are transmitted in multiplexed mode to obtain stereophony or quadriphony.

However, in the device according to the invention, the transmission channel of the transmitted signal is made independent.

Thus, on the contrary, it is also possible to transmit the signal (even a monophonic signal) on several channels, for example on adjacent frequencies. The choice of the number of channels used depends on the throughput of data to be transmitted divided by the throughput of data which can be transmitted by a channel.

Figure 10:
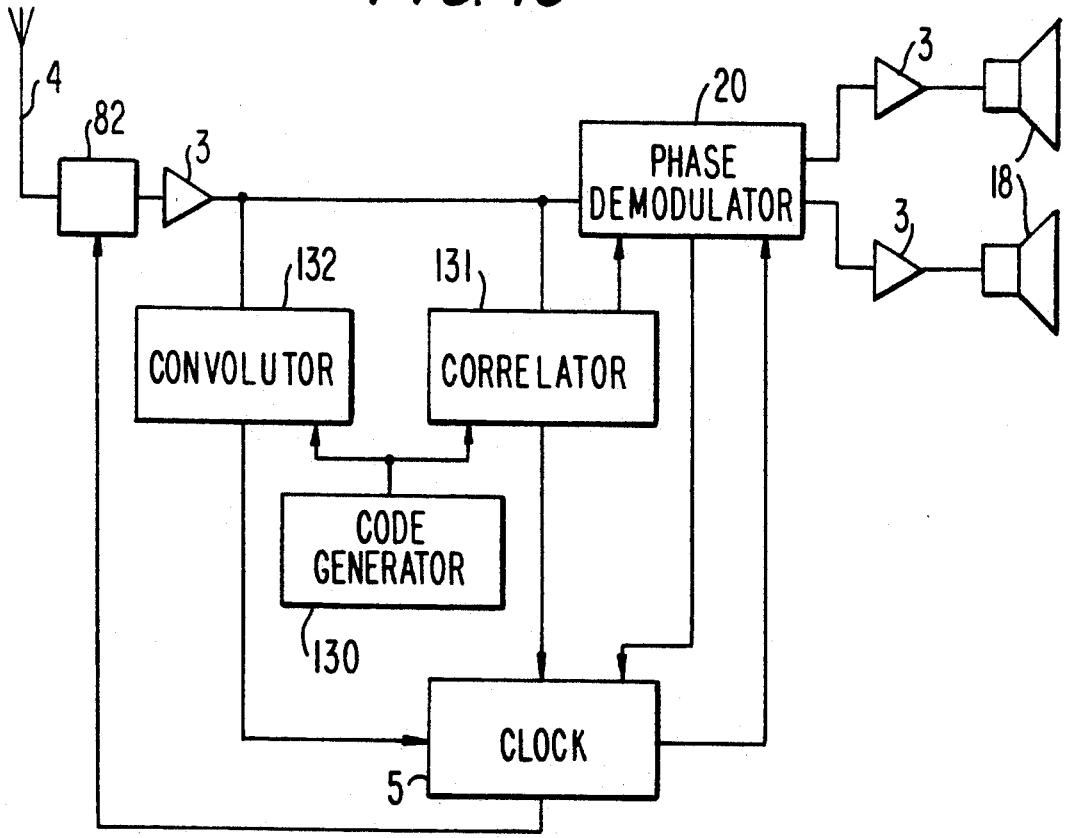
FIG. 10 is a diagram of a radio receiver according to the invention.

FIG. 10 shows an embodiment of a radio broadcast receiving device according to the invention. The device includes the following elements connected in series: an antenna 4, a frequency changing device 82, an intermediate frequency amplifier 3, a phase demodulation device 20, audiophonic amplifiers 3 and loudspeakers 18. The clock 5 is connected to the frequency changing device 82. A convolutor 132 and a correlator 131 are connected to the output of the intermediate frequency amplifier 3. The convoluter 132 and the correlator 131 receive a pseudo-random code generated by a pseudo-random code generator 130. The convolutor 132 and the correlator 131 are connected to a clock 5. The clock 5 is connected to the phase demodulation device 20.

In the example shown in FIG. 10, since the receiver is stereophonic, it has two channels symbolized by two audiophonic amplifiers 3 and two loudspeakers 18.

The two-way link between the phase modulator 20 and the clock 5 enables the automatic linking of the demodulation with the clock synchronization and enables the clock synchronization according to the result of the demodulation.

The convolutor 132 has the advantage of very simple construction. It enables a first synchronization of the clock 5. The correlator 131 enables the fine synchronization of the clock 5 providing for comparison of the phases of the signals received. The embodiment shown in FIG. 10 is an analog device. It is understood that digital radiophonic receivers are not beyond the scope of the present invention.

Figure 11:
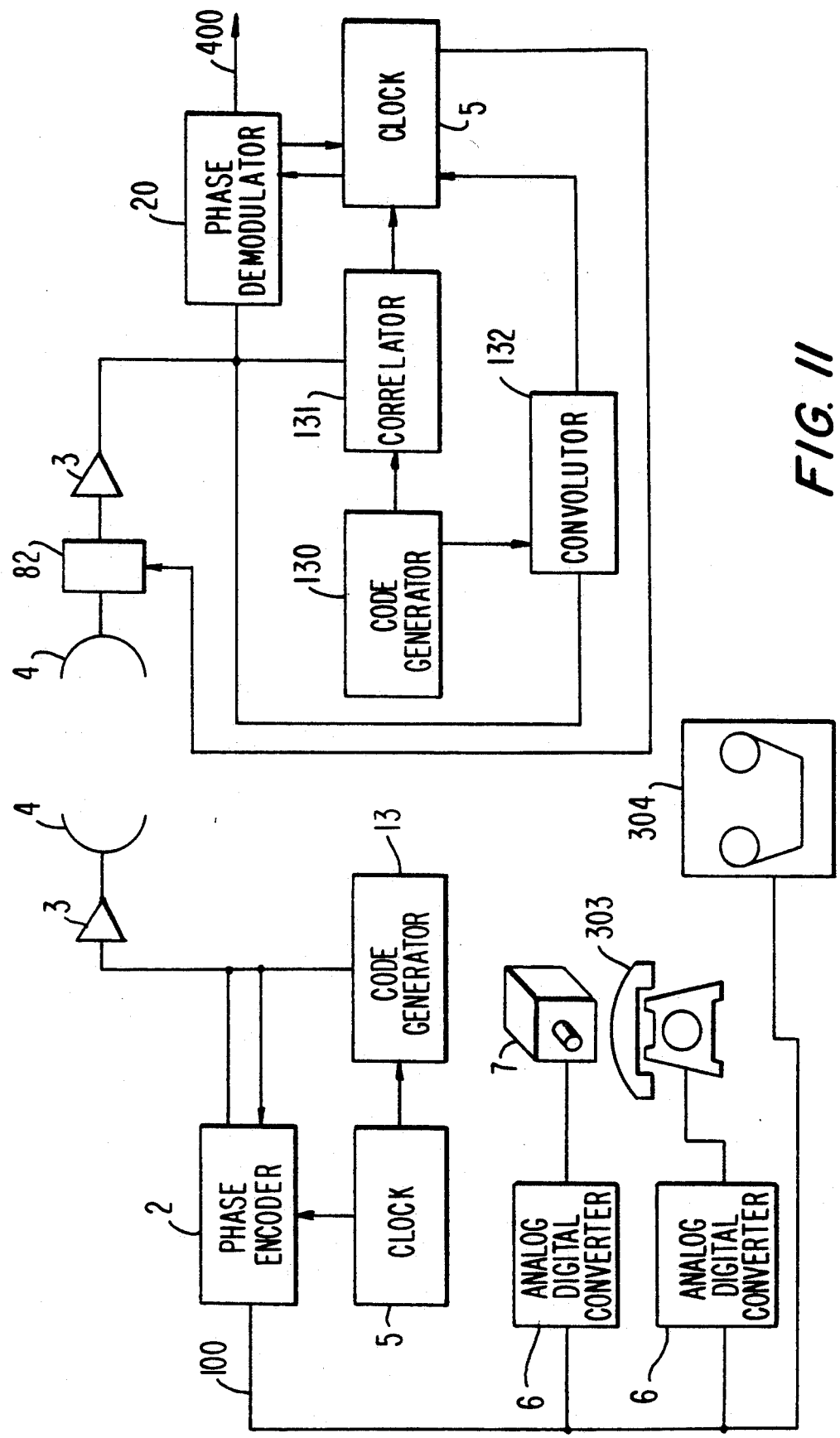
FIG. 11 is a diagram of an embodiment of a data transmission device according to the invention.

FIG. 11 shows a data transmission device according to the invention. The device has a transmission set as well as a reception set.

The transmission device has the following elements connected in series: a phase-encoding device 2, an amplifier 3 and a transmission antenna 4. A high precision clock 5 is connected, firstly, to the phase-encoding device 2 with the carrier frequency generating oscillator 821 and, secondly, a code (for example pseudo-random code) generator 13. The pseuod-random code generator 13 is connected to the phase encoding device 2 and/or directly to the input of the amplifier 3. The phase-encoding device 2 receives digital data on the line 100, for example television broadcasts coming from the television camera 7, telephone lines 303 or computer data coming from computers 304.

The reception device has the following elements connected in series: an antenna 4, a frequency changing device 82 locked into the clock 5, an intermediate frequency amplifier 3, a phase demodulating device 20. A correlator 131 and/or a convolutor 132 are connected in parallel to the output of the amplifier 3. Furthermore, the correlator 131 and/or the convolutor 132 are connected to a pseudo-random code generator 130. The correlator 131 and/or the convolutor 132 are connected to the input of a clock 5. The clock 5 is connected to the phase demodulation device 20.

The phase-encoding device 2 receives the data to be transmitted on the line 100. It does the phase encoding synchronized by the clock 5. The clock 5 also provides for the synchronization of the transmission of a pseudo-random code 13. The pseudo-random code generated by the generator 13 is emitted alternately with the signal modulated by the phase-encoding device 2, i.e. it enables the phase modulation of the signal to be transmitted.

In an alternative embodiment of the device according to the invention, a part of the code is transmitted when the transmissions of the useful signal are stopped. This part enables a first synchronization of the clocks, the fine synchronization being obtained from the modulation of the transmitted signal.

The amplifier 3 amplifies the signal to be transmitted. The antenna 4 transmits the signal.

At reception, the antenna 4 picks up the transmitted signal. The device 82 reduces the frequency of the signal, for example by performing beats of the received signal with a local oscillator 81 locked into the clock 5. The intermediate frequency amplifier 3 amplifies the signal, the frequency of which has been reduced. The correlator 131 and/or the convolutor 132 respectively do the correlation and/or convolution of the received signal with a code generated by a pseudo-random code generator 130. The correlation and/or convolution signal enables the synchronization of the reception clock with the transmission clock 5. Once the clocks are synchronized, the phase demodulation device 20 enables the obtaining of a digital signal on the line 400. Advantageously, a multiple echo eliminating device is associated. This device works similarly to the device used in television.

Advantageously, the transmission and/or reception device comprises a control center 8.

Figure 12:
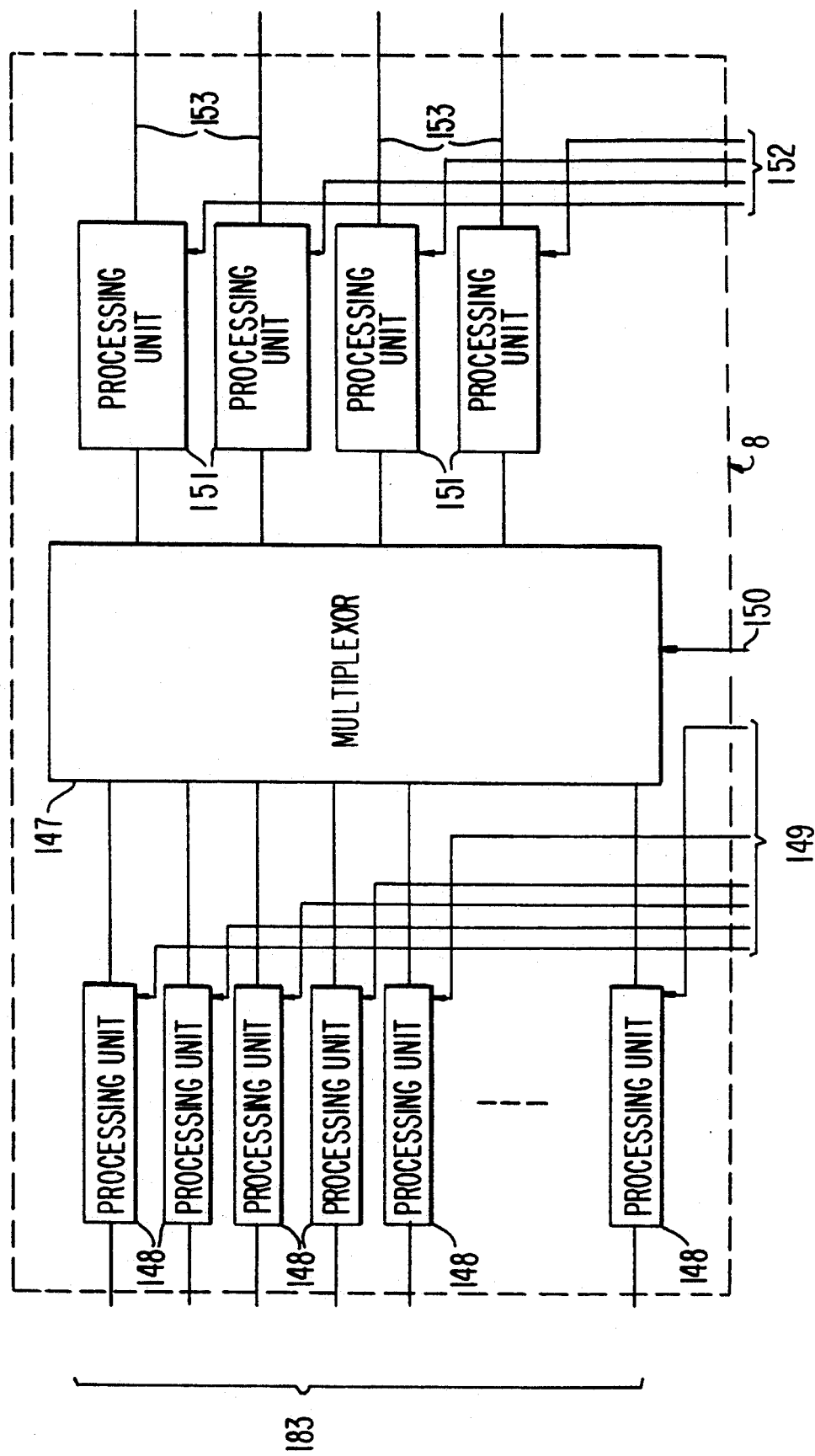
FIG. 12 is a diagram of a control center used in the device according to the invention.

FIG. 12 shows an embodiment of the control center 8 by which the advantages of the device according to the invention can be used.

The control center 8 comprises several input lines 183 connected to first processing units 148, a mixing and multiplexing unit 147, second processing units 151 and output lines 153.

The processing units 148 are connected to control lines 149. The mixing and multiplexing unit 147 is connected to a control line 150.

The processing units 151 are connected to lines 152. The units 148 receive the signals to be processed on the lines 183. The processing units 148 process the received signals individually. For example, for video images, the processing units 148 can perform geometric variations of the image or modifications of colors on command.

The mixing and multiplexing unit 147 is used to obtain images to be transmitted from among several images by superimposing them and/or assigning a part of the screen to each image.

Furthermore, the mixing and multiplexing unit distributes the data to be transmitted among the available transmission channels. In the example shown in FIG. 12, the mixing and multiplexing unit 147 can distribute the data to be transmitted among four physical channels. Thus, the transmission throughput is no longer limited by the throughput of one channel. At reception, the data is reconstituted from all four channels. This device is extremely flexible. It is possible both to distribute a signal among, for example, four channels and transmit the video signal in a single channel along with the sound signal, service information and alphanumeric data.

Advantageously, the service signals indicate the distribution of data in various channels to the receiver.

The processing units 151 are used to perform mmodifications of the signal to be transmitted. The digital processing makes it possible to do the modifications separately on, for example, the sound part and the video part of the signal.

Figure 13:
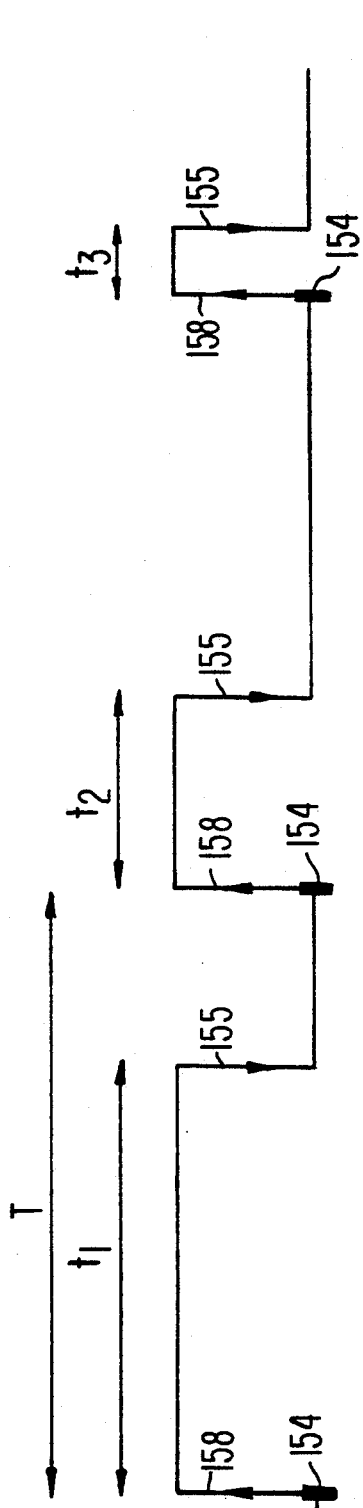
FIG. 13 is a timing diagram of a modulation according to the invention.

FIG. 13 shows a timing diagram illustrating a modulation which can be used in the device of the invention. This modulation enables transmissions, especially digital transmissions, each word being transmitted in a period T included between the instants 154 evenly distributed in time. A transition 158, for example, a $\pi$ phase transition, is done at the instants 154. A second transition 155 is done during the period T. The instant when the transition 155 occurs determines the digital value or analog information transmitted. In the example shown in FIG. 13, three values $t_1$, $t_2$ and $t_3$, corresponding to the time elapsed between the transition 158 and the transition 155, are transmitted.

Figure 14:
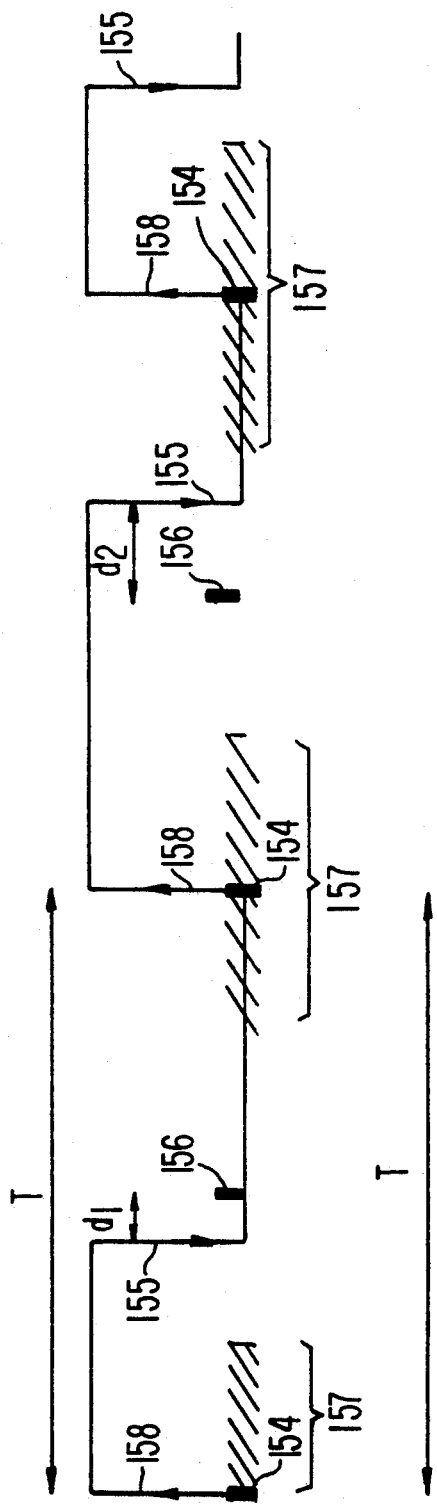
FIG. 14 is a timing diagram of a modulation according to the invention.

FIG. 14 shows an example of modulation by which the pass-band needed for the transmissions can be limited. In this alternative embodiment, the instants 154 of the transitions 158 are preceded and followed by time intervals 157 during which it is seen to it that there is no transition 155. This avoids the need to transmit two transitions 158, 155, that are too close to each other and have a very wide frequency spectrum.

For a time interval 157 during which it is seen to it that there is no transition 155 equal to T/4, the energy included in the first order harmonic is equal to 40.5% of the total energy.

Advantageously, the duration of the interval 157 is equal to T/2. In this case 81% of the total energy is in the first order harmonic. The value T2 for the interval 157 is close to the optimum value by which it is possible to minimize the minor lobes (higher order harmonic). These values have been computed for perfectly square signals, i.e. for almost instantaneous passages from 0 to $\pi$ and from $\pi$ to 0.

In the example shown in FIG. 14, two values $d_1$, $d_2$, are transmitted, corresponding to the time between the transition 155 and the midpoint 156 of the interval T. In the example shown, $d_1$ is a negative number while $d_2$ is a positive number.

Figure 15:
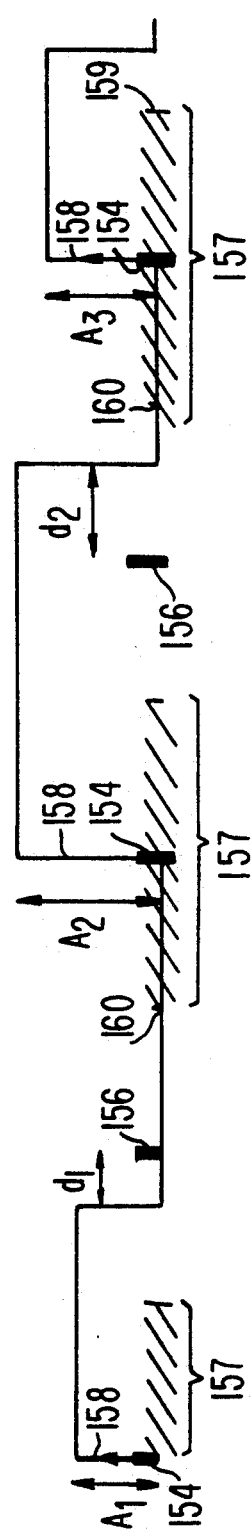
FIG. 15 is a timing diagram of a modulation according to the invention.

FIG. 15 shows an example of modulation comprising two orthogonal modulations, namely modulations that are independent of one another. In addition to a modulation similar to the one shown in FIG. 14, an amplitude modulation is used. Thus, in addition the data transmitted in phase modulation, it is possible to transmit data $A_1$, $A_2$, $A_3$ in amplitude modulation. However it is imperative that the amplitude transmitted should not be below a threshold necessary for the measurement of the periods t (FIG. 13) or d (FIGS. 14 and 15). The use of the amplitude modulation, associated for example with a phase modulation, enables a reduction in the precision of the phase and amplitude detection for a given data throughput rate and/or an increase in the throughput of data which can be transmitted.

Figure 16:
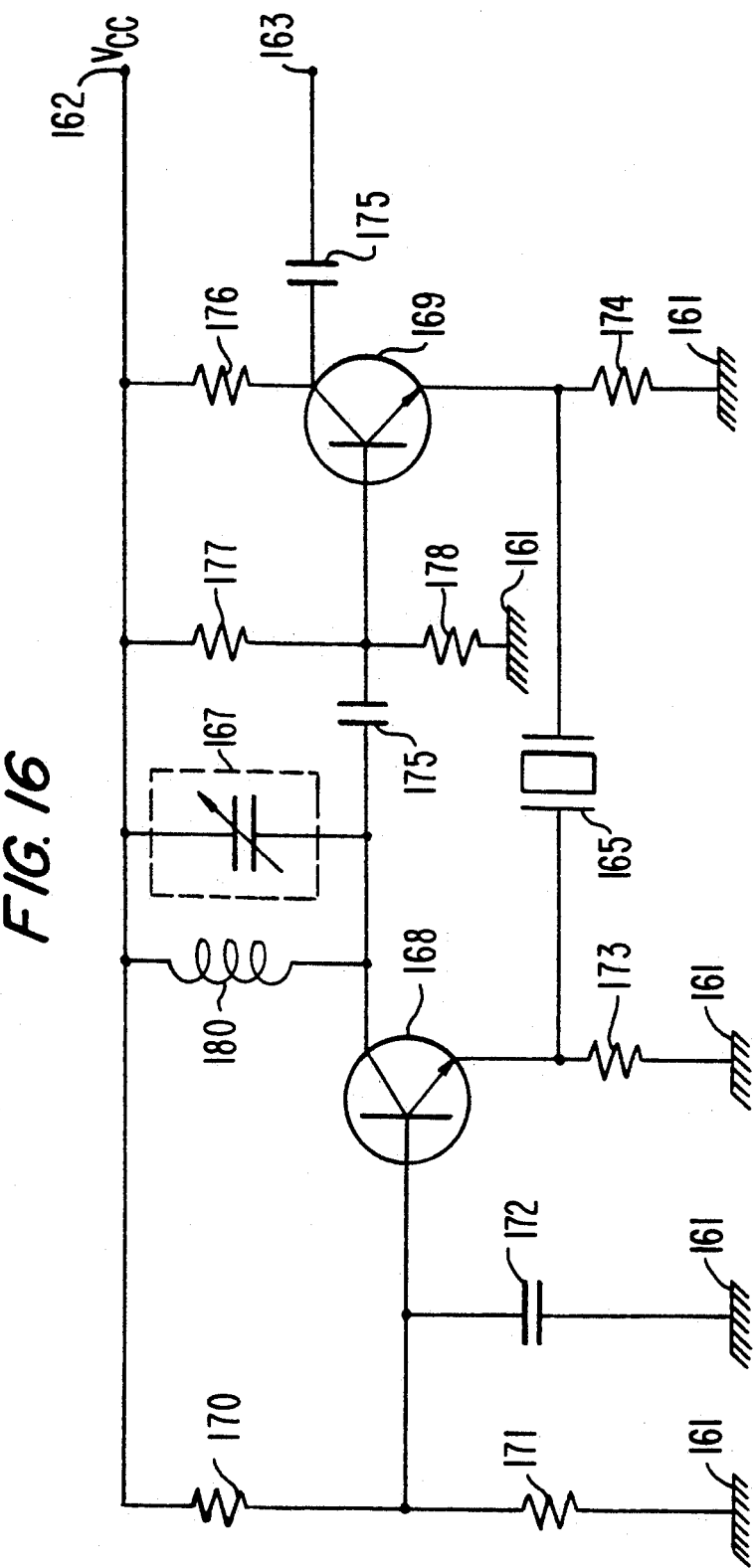
FIG. 16 is a diagram of an oscillator which can be applied in the device according to the invention.

FIG. 16 shows an embodiment of a quartz oscillator which can act as a clocking device for the clocks used in the device according to the invention.

The oscillator comprises a quartz crystal 165, connected between the collectors of two transistors 168 and 169. Furthermore, the emitters of the transistors 168 and 169 are connected to the ground 161 by means of resistors, 173 and 174 respectively. The base of the transistor 168 is connected to the capacitor 172 and to the resistors 171 and 170. The capacitor 172 and the resistor 171 are connected to the ground 161. The resistors 170, 177 and 176, the choke 180 as well as a variable capacitance device 167 are connected to the terminal 162. The terminal 162 is connected to the electrical power supply and carried, for example, to the potential 12 V. The resistor 177 as well as a resistor 178 are connected to the base of the transistor 169. Furthermore, the resistor 178 is connected to the ground 161.

The choke 180 as well as the variable capacitance device 167 are connected to the collector of the transistor 168. The collector of the transistor 168 is connected through a capacitor 179 to the base of the transistor 169. The resistor 176 is connected to the collector of the transistor 169. The collector of the transistor 169 is connected through a capacitor 175 to the output terminal 163.

The variable capacitance device 168 enables the matching of the resonance frequency of the oscillator. The variable capacitance device 167 comprises for example, a variable capacitor or a switching capacitor battery. Advantageously, the variable capacitance device 167 comprises Varicap diodes which provide for the easier automatic locking of the oscillator.

Figure 17:
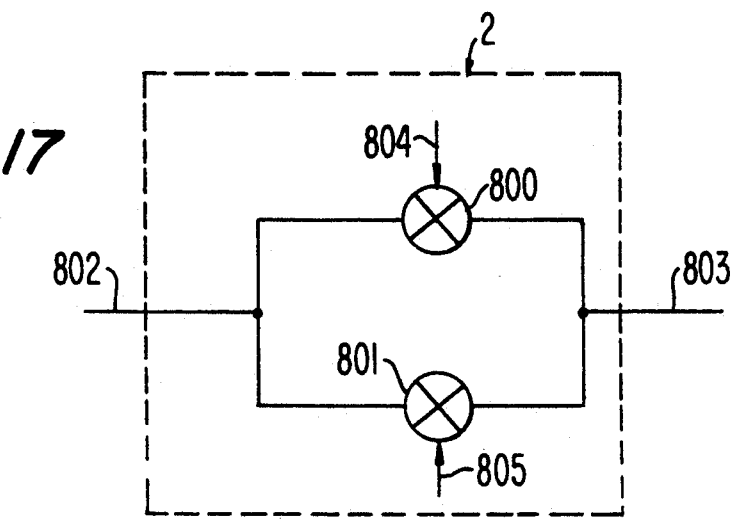
FIG. 17 is a diagram of a first embodiment of a phase encoder which can be applied in the device according to the invention.

FIG. 17 shows an example of a phase encoder 2. The phase encoder comprises two duplexers 800 and 801 placed in parallel between an input 802 and an output 803.

The input 802 of the phase encoder 2 can receive the carrier. The duplexer 800 can mix the signal 804 with the carrier. The duplexer 801 can mix the signal 805, which is identical to 804 but is phase-shifted by $\pi/2$, with the carrier. The signals of two recombined branches are present at the output 803 of the phase encoder 2.

Advantageously, for digital transmissions, the phase of the signal is encoded with a phase noise, the $\rho$ type deviation is equal to twice the quantification pitch q:

$$\rho = 2q.$$

Figure 18:
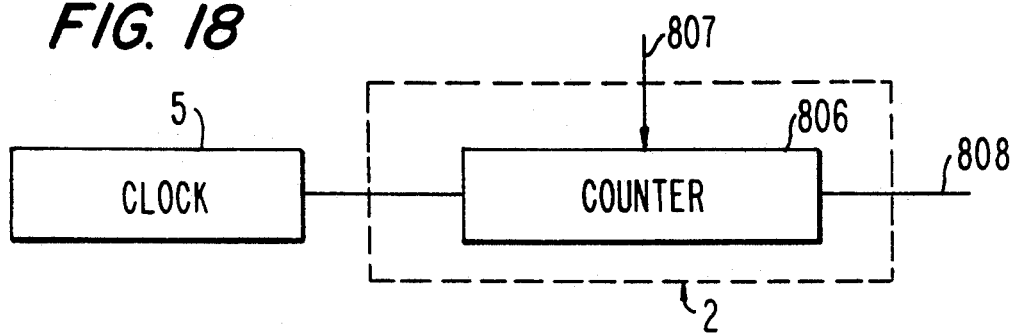
FIG. 18 is a diagram of a second embodiment of a phase encoder which can be applied in the device according to the invention.

FIG. 18 shows a digital phase encoder 2. The phase encoder 2 has a counter 806 which can be reset at 0 by a command 807. Advantageously, the counter 806 is a binary counter. For example, the decimal value 128 or 256 is followed by the value 0. The counter 806 is connected to a clock 5.

At each clock pulse, the counter 806 delivers a signal, for example a square signal. Thus if, at the instant $t_0$, the counter 806 is forced to the value 0, it will, at this instant, generate the start of a square signal at its output 808. Thus, the phase of the signal will be modified. To obtain a phase modulation of the signal, it suffices to act on the command 807 of the counter 806. The modulated signal present at the output 808 of the phase encoding device 2 can be put on a carrier.

In one alternative embodiment of the device according to the invention, the clock 5 frequency is greater than the carrier frequency. For example, the clock frequency is equal to 4096 times the carrier frequency, the counter 806 being a counter with a maximum value of 128. Thus, at each period of the carrier, a five bit number is transmitted. Thus, the system is at the limit of phase modulation and frequency modulation.

Figure 19:
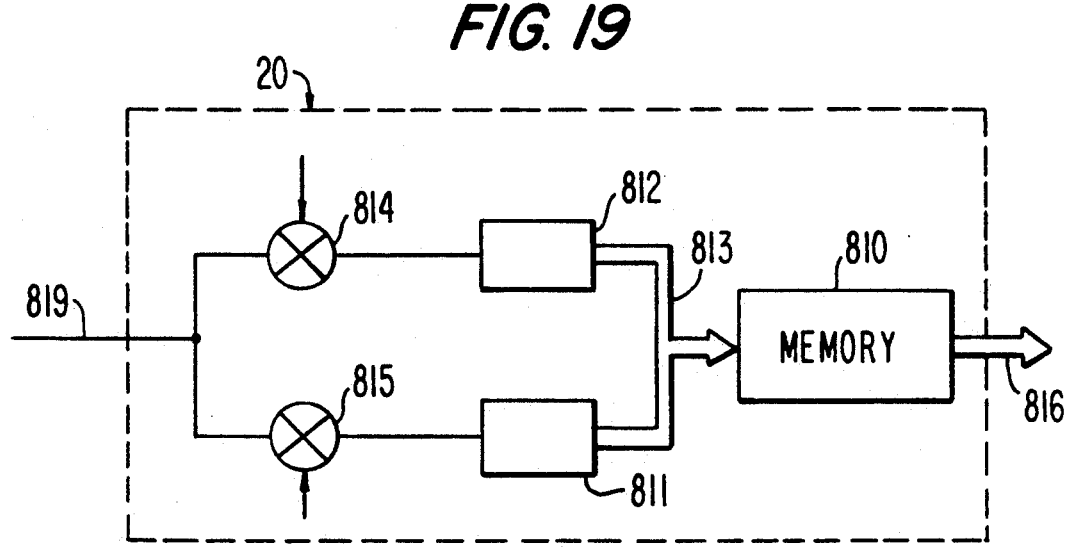
FIG. 19 is a diagram of a first embodiment of a phase demodulator which can be used in the device according to the invention.

FIG. 19 shows a phase-decoding device 20. The device 20 has two branches, each comprising a duplexer 814 and 815 connected to an analog/digital converter, 812 and 811 respectively. The analog/digital converters 811 and 812 are connected by a bus 813 to a device 810 used to compute the phase. The digital value of the phase is emitted by the device 810 on a bus 816.

The duplexers 814 and 815 receive the signals for which the relative phase shift is equal to $\pi/2$. Thus, the duplexers 814 and 815 can extract the real and imaginary parts of the signal. The analog/digital converters 812, 811 convert the sines and cosines of the phase of the signal into their digital values. The device 810 associates the phase angle with the pair (sine, cosine).

In a first embodiment of the device according to the invention, the device 840 is a computer.

Advantageously, the device 810 is a permanent memory. In this case, the bus 813 is an address bus of the said memory, the bus 816 being a data bus.

Figure 20:
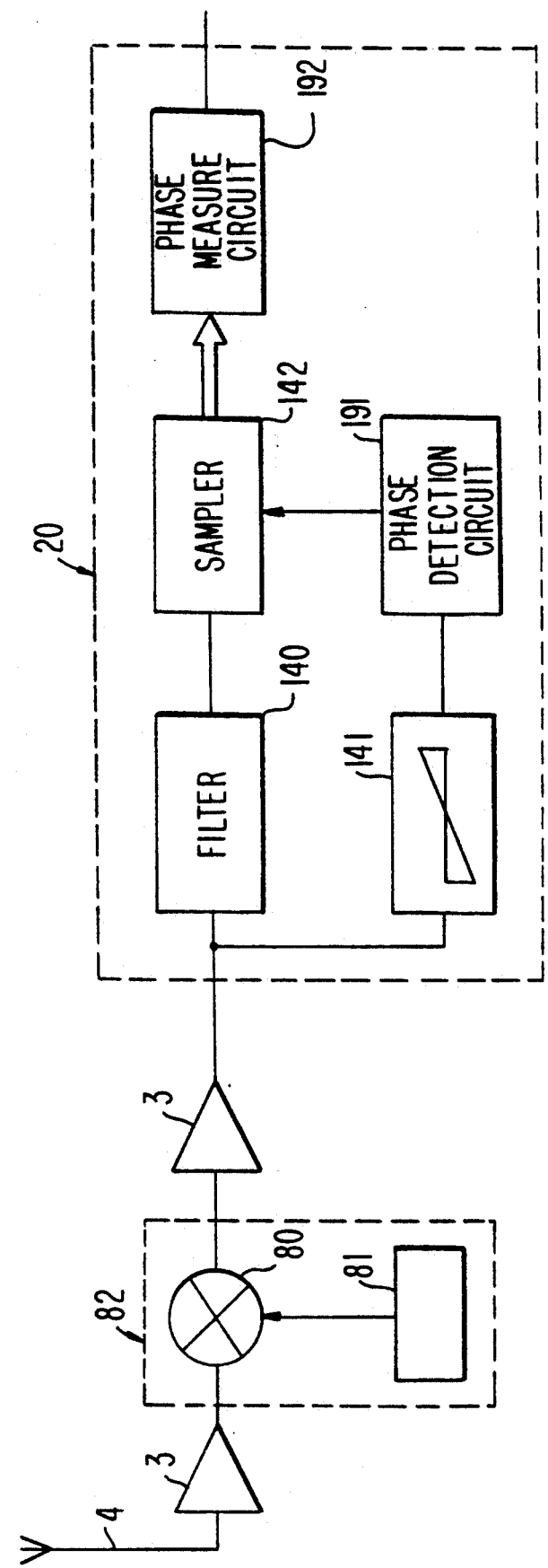
FIG. 20 is a diagram of a second embodiment of a phase demodulator according to the invention.

FIG. 20 shows an embodiment of a device 20 used for the successive measurement of the phase of various signal samples. The device 20 comprises the following connected in series: an adapted filter 140, a digital sampler 142 and a phase measuring device 192. An odd filter 141 is connected to the input of the adapted filter 140. The output of the odd filter 141 is connected to the input of a phase detection device 191. The phase detection device 191 controls the sampling device 142. The detection device 191 is, for example, a Schmit trigger. The phase measuring device 192 is, for example, a phase comparator comparing the phase of the received signal with a reference phase received by a line 850.

In an analog type alternative embodiment of the device according to the invention, the adapted filters 140 and the odd value filters 141 are made, for example, in the form of a surface acoustic wave device.

In a second alternative embodiment of the device according to the invention, the adapted filters 140 and the odd value filters 141 are digital filters.

In the example shown in FIG. 20, the device according to the invention is connected to a phase modulated wave reception device. The phase modulated waves transmit, for example, television broadcasts, radio broadcast, control instructions or alphanumeric data. In an example shown in FIG. 20, the reception device comprises the following elements connected in series: a reception antenna 4, a microwave amplifier 3, a frequency reduction device 82, an intermediate frequency amplifier 3. The frequency reduction device 82 comprises, for example, a duplexer 80 connected firstly, to the microwave amplifier 3 and secondly, to a local oscillator 81.

In a simplified alternative embodiment of the device according to the invention, the detection device 191 directly controls the phase measuring device 192.

When the signal that has crossed the odd filter 141 goes through 0, the detection device sends a control signal to enable the sampling of the signal. The passage of the signal through 0 corresponds to the point 199 of FIG. 6 and, hence, to the point 197 of FIGS. 4 and 5. When making the device 20 according to the invention, it is carefully seen to it that the delays induced in the branch comprising the adapted filter 140 and the sampler 142 are compensated for by the delay induced in the branch comprising the odd filter 141 and the detection filter 191.

Figure 21:
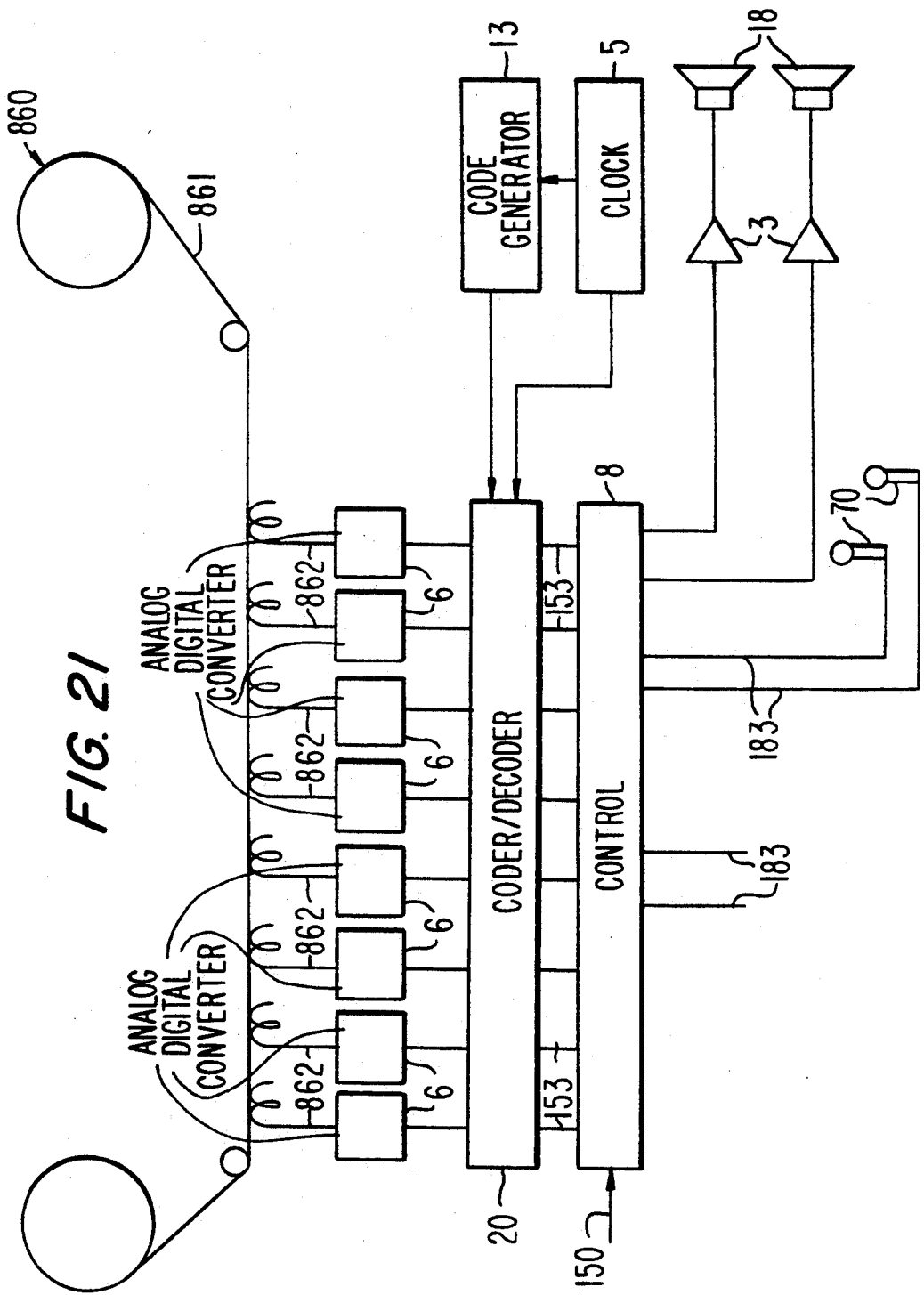
FIG. 21 is a diagram of an embodiment of a recorder according to the present invention.

FIG. 21 shows an example of an embodiment of a recorder and/or reader according to the invention. In the non-restrictive example of FIG. 21, the recorder is a magnetic tape recorder 861. It is clearly understood that the principle of the invention also applies to other types of recorders and/or readers such as, for example, optical or mechanical recorders and/or readers. Similarly, recorders and/or readers using magnetic media other than tapes such as, for example, magnetic diskettes, are not beyond the scope of the present invention.

A mechanism 860 provides for the even running of the magnetic tape past several magnetic heads 862. The example shown in FIG. 21 is a tape recorder with 9 write/read heads. The erasing heads are not shown. It is of course possible to replace each write/read head 862 by a pair of write heads and read heads. Each head 862 is connected, in the example of a digital embodiment of the tape recorder, to a converter 6. The converters 6 are connected to a signal encoding/decoding device 20 by the lines 153. The encoding/decoding device 20 is connected to a control center 8. The control center 8 is connected by lines 183 to sources of signals to be recorded, such as, for example, microphones 70.

The control center 8 is connected by an amplifier 3 to loudspeakers 18. The control center 8 receives a control signal 150 by which the tape recorder settings are made.

A clock 5 is connected, firstly, to a code generator 13, and, secondly, to the encoding/decoding device 20.

When recording: the control center 8 distributes the data to be stored among the recording tracks and performs the prior processing operations of the signal. Advantageously, the distribution of the signal among the tracks depends on the desired recording quality and the speed at which the tape runs. The encoding/decoding device 20 uses, for example, the modulation shown in FIG. 14. The converters 6 adapt the digital signal received to amplitudes which capable of being recorded on the tape 861 by the heads 862.

The code generator 13 is used to record a code, for example, a regular code $0\ \pi, 0, \pi, 0, \pi, \ldots$ on the magnetic tape 861. The recording of this code makes it possible to synchronize the clock 5 at the reading stage.

The recording of the code is either superimposed on the signal or intermittant with a periodicity suited to the requirements of re-synchronizing the clock 5.

When reading: the heads 862 generate an electrical signal from the signal stored on the tape.

Advantageously, the converters 6 form square signals, the leading edges of which correspond to the magnetic transitions on the tape 861.

The decoding device 20 gives the digital values of the signal on the lines 153. The control center 8 is used to reconstitute the useful signal from the various channels.

In the example shown in FIG. 21, two audiophonic signals are reconstituted to obtain stereophonic sound. In this case, the digital signals are converted into analog audio signals, and the digital/analog converters are, for example, included in the control center 8. The analog signals are amplified by the amplifiers 3 and converted into sound waves by the loudspeakers 18.

Advantageously, the recorder according to the invention has a memory, not shown, used to store data, collected from the magnetic tape 861. The memory is re-read periodically. Thus, variations in the running speed of the magnetic tape are got rid of.

Advantageously, the control center 8 can take magnetic coupling between adjacent tracks (crosstalk) into account. It is possible, for example, to cause a known magnetic coupling, by a magnetic shunt, between the heads 862 in order to eliminate it more efficiently by computation.

The invention can be applied, in particular, to the transmission and recording of analog and/or digital data by phase modulation. The invention applies mainly to the transmission of radio programmes, television broadcasts or digital data.

What is claimed is:

1. A method for data transmission, from a transmitter towards at least one receiver, comprising, using similar code generators in the transmitter and in the receiver, and in said transmitter, the steps of:

phase modulating a data signal to be transmitted;

superimposing onto the phase modulated data signal a signal having an amplitude lower than the amplitude of the phase modulated data signal for synchronization of said receiver, said signal for synchronization having a period longer than a period of said phase modulated data signal and modulating in amplitude said phase modulated data signal; and transmitting said amplitude and phase modulated data signal.

2. A method according to claim 1, wherein said signal for synchronization comprises a code from a known code generator by said at least one receiver said method comprising in each of said at least one receiver, the steps of:

amplitude demodulating said signal for the synchronization;

extracting the superimposed synchronization signal;

producing synchronization spikes, by computing the correlation and/or the convolution of said signal for the synchronization with said code known by said at least one receiver.

3. A method according to claim 2, wherein said code is a pseudo-random code.

4. A method according to claim 2 or 3, wherein said step of producing synchronization spikes comprises the steps of:

synchronizing a clock signal with the sampling frequency of said signal for synchronization;

phase synchronizing said clock signal with said phase modulated data signal, by shifting said code in respect to said phase modulated data signal.

5. A method according to claim 4, wherein said signal for synchronization further comprises data complementary to said data signal.

6. A method according to claim 5, in which said data signal is a television signal, wherein said data complementary to said data signal comprises data which, after numerical video processing, improves the quality of received images.

7. A method according to claim 6, wherein said signal for synchronization comprises first transitions, occurring at instants evenly distributed in time, and second transitions, occurring at instants of time constituting the encoding of the information to be transmitted.

8. A method according to claim 7, characterized in that said method is used for the transmission of at least one type of transmission selected among the group comprising:

television broadcasting;
radio sound broadcasting;
alphanumeric data transmission.

9. A method according to claim 3, wherein said signal for the synchronization further comprises data complementary to said data signal.

10. A method according to claim 9, in which said data signal is a television signal, wherein said data complementary to said data signal comprises data which, after numerical video processing, improves the quality of received images.

11. A method according to claim 1, wherein said signal for synchronization comprises first transitions, occurring at instants evenly distributed in time, and second transitions, occurring at different instants of time constituting the information to be transmitted.

12. A method according to claim 1, characterized in that said method is used for the transmission of at least one type of transmission selected from the group comprising:

television broadcasting;
radio broadcasting;
alphanumeric data transmission.

13. A transmitter of a data signal, comprising:

a source of data signal;

means for phase modulation of said data signal;

means for generating a code with a synchronization period longer than a period of the data signal; and means for amplitude modulation of the phase modulated data signal in accordance with the generated code and with an amplitude lower than the amplitude of the phase modulated data signal.

14. A transmitter according to claim 13, further comprising pulse compression means for receiving said phase and amplitude modulated signal, and for pulse compressing said signal whereby, permitting an increase the signal/noise ratio.

15. A transmitter according to any of claims 13 or 14, further comprising control center receiving the compressed signal and means for distribution of data to be transmitted to a plurality of transmission channels.

16. A transmitter according to claim 15, wherein said control center is digital.

17. A transmitter according to claim 14, characterized in that said transmitter is used for the transmission of at least one type of broadcast of the group comprising:

television broadcast;
radio broadcast;
alphanumeric data transmission.

18. A receiver of a data amplitude and phase modulated signal, comprising:

means for receiving a signal having an amplitude modulated synchronization and a phase modulated data;

means for amplitude demodulation of said signal for synchronization;

means for generating a code;

means for computing the convolution and/or the correlation of said signal for synchronization with said code, producing synchronization spikes;

means for phase demodulation of said data from said signal, and wherein said signal for synchronization has a longer period than a period of the phase demodulated data signal.

19. A receiver according to claim 18 wherein said means for computing comprises convolution means and correlation means, said convolution means realizing a first synchronization of said receiver, and said correlation means for realizing a fine synchronization of said receiver.

20. A receiver according to claim 18 or 19, wherein said means for computing the convolution and/or the correlation comprises convolution means (132), with a charge transfer device having at least one cell at an output of said charge transfer device, said at least one cell providing said code.

21. A receiver according to claim 20, comprising processing means for eliminating multiple-echoes by subtracting them from a received direct signal or by delaying them from the received direct signal so as to put them in modulo $2\pi$ phase with the direct signal.

22. A receiver according to claim 21, wherein said processing means resolves the system:

$$-Y_n = a_0S_0 + a_1S_1 - a_2S_2 + \ldots + a_nS_n$$

-continued
$$-Y_{n+1} = a_0S_1 + a_1S_2 - a_2S_3 + \ldots + a_nS_{n+1}$$
$$-Y_{n+2} = a_0S_2 + a_1S_3 - a_2S_4 + \ldots + a_nS_{n+2}$$
$$-Y_{n+3} = a_0S_3 + a_1S_4 - a_2S_5 + \ldots + a_nS_{n+3}$$
$$-\ldots$$
$$-Y_{n+i} = a_0S_i + a_1S_{i+1} + a_2S_{i+2} + \ldots + a_nS_{n+i}$$
$$-\ldots$$
$$-Y_{n+p} = a_0S_p + a_1S_{p+1} + \ldots + a_nS_{p+n}$$

$a_1$ representing the complex amplitude of the first reflected signal, $a_2$ that of the second reflected signal, $a_3$ that of the third reflected signal, $a_i$ that of the $i^{th}$ reflected signal, $a_n$ representing the amplitude of the direct signal, $Y_{n+i}$ being the signal received at the instant n+i.

23. A receiver according to claim 22, wherein said processing means comprises a programmable digital filter.

24. A receiver according to claim 23, further comprising a random-access video memory means (24) for storing video signals and address processor means (22) for replacing data stored in said random-access video memory by newly received transmitted data.

25. A receiver according to claim 24, wherein said random-access video memory (24) means capable of storing at least one video image, and further comprising a computer (23) connected to said memory means (24), said computer being capable of modifying all or a part of said image stored in said random access video memory means, in respect to complementary data transmitted by said signal for the synchronization.

26. A receiver according to claim 25, further comprising a frequency reduction device (82) including a timer, said frequency reduction device being connected to an input of the receiver and to a receiving antenna.

27. A receiver according to claim 26, characterized in that said receiver is used for the reception of at least one type of broadcast selected from the group consisting of:
television broadcasts;
radio broadcast;
alphanumeric data transmission.

28. A receiver according to claim 18, comprising processing means capable of eliminating multiple-echoes by subtracting them from the signal or by delaying them so as to put them in modulo $2\pi$ phase with the direct signal.

29. A receiver according to claim 28, wherein said processing means resolves the system:

$$-Y_n = a_0S_0 + a_1S_1 - a_2S_2 + \ldots + a_nS_n$$
$$-Y_{n+1} = a_0S_1 + a_1S_2 - a_2S_3 + \ldots + a_nS_{n+1}$$
$$-Y_{n+2} = a_0S_2 + a_1S_3 - a_2S_4 + \ldots + a_nS_{n+2}$$

-continued
$$-Y_{n+3} = a_0S_3 + a_1S_4 - a_2S_5 + \ldots + a_nS_{n+3}$$
$$-\ldots$$
$$-Y_{n+i} = a_0S_i + a_1S_{i+1} + a_2S_{i+2} + \ldots + a_nS_{n+i}$$
$$-\ldots$$
$$-Y_{n+p} = a_0S_p + a_1S_{p+1} + \ldots + a_nS_{p+n}$$

$a_1$ representing the complex amplitude of the first reflected signal, $a_2$ that of the second reflected signal, $a_3$ that of the third reflected signal, $a_i$ that of the $i^{th}$ reflected signal, $a_n$ representing the amplitude of the direct signal, $Y_{n+i}$ being the signal received at the instant n+i.

30. A receiver according to any of claims 28 or 29, wherein said processing means comprises a programmable digital filter.

31. A receiver according to claim 18, comprising random-access video memory (24) means for storing video signals and address processor means for replacing data located in said random-access video memory by newly received transmitted data.

32. A receiver according to claim 18, wherein said random-access video memory (24) means stores at least one video image, and further comprising a computer (23) connected to said memory means (24), said computer being capable of modifying all or a part of said image stored in said random access video memory means, in respect to complementary data transmitted by said signal for the synchronization.

33. A receiver according to claim 18, comprising a frequency reduction device (82) including a timer, said frequency reduction device being connected to an input of the receiver and to a receiving antenna.

34. A data transmission device comprising a transmitter and a receiver; wherein said transmitter includes:
a source of data signal;
means for phase modulation of said data signal;
means for generating a code;
means for amplitude modulation of the phase modulated data signal in accordance with the generated code; and
means for transmitting said amplitude phase modulated signal,
and wherein said receiver includes:
means for receiving said amplitude and phase modulated data signal;
means for the amplitude demodulation of said signal;
means for generating a code identical to said code of said transmitter;
means for computing the convolution and/or the correlation of said signal for synchronization with said code, producing synchronization spikes;
means for the phase demodulation of said data signal.

* * * * *

UNITED STATES PATENT AND TRADEMARK OFFICE
CERTIFICATE OF CORRECTION

PATENT NO. : 5,271,043
DATED : Dec. 14, 1993
INVENTOR(S) : Yvon Fouche, et al

It is certified that error appears in the above-indentified patent and that said Letters Patent is hereby corrected as shown below:

On title page, item [22] change "Nov. 8, 1991" to
read  --[63] Continuation of Ser. No. 214,724, May 24, 1988, abandoned, filed as PCT/FR 87/00385, October 6, 1987.--

Signed and Sealed this

Fourteenth Day of June, 1994

Attest:

BRUCE LEHMAN

*Attesting Officer*           *Commissioner of Patents and Trademarks*